US006567148B1

United States Patent
Akiyama et al.

(10) Patent No.: US 6,567,148 B1
(45) Date of Patent: May 20, 2003

(54) ELECTRODE SUBSTRATE HAVING PARTICULAR PROJECTING PORTION, MANUFACTURING METHOD THEREOF, AND LIQUID CRYSTAL DISPLAY ELEMENT

(75) Inventors: Hisashi Akiyama, Kashiwa (JP); Nobuyuki Itoh, Noda (JP); Masaaki Kabe, Kashiwa (JP)

(73) Assignees: Sharp Kabushiki Kaisha, Osaka (JP); The Secretary of State for Defence in Her Britannic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/394,572

(22) Filed: Sep. 10, 1999

(30) Foreign Application Priority Data

Sep. 10, 1998 (JP) .......................... 10-257217
Sep. 10, 1999 (JP) .......................... 11-257572

(51) Int. Cl.$^7$ ...................... G02F 1/1333; G02F 1/1343
(52) U.S. Cl. ................ 349/158; 349/147; 349/148
(58) Field of Search ................ 349/158, 155, 349/156, 147, 148

(56) References Cited

U.S. PATENT DOCUMENTS

| 4,255,474 A | | 3/1981 | Smith, Jr. .................. 428/46 |
| 4,277,517 A | | 7/1981 | Smith, Jr. .................. 427/96 |
| 4,291,947 A | | 9/1981 | Cirkler et al. .............. 350/336 |
| 5,421,926 A | | 6/1995 | Yukinobu et al. ............ 156/83 |
| 5,604,613 A | * | 2/1997 | Shinjo et al. ............... 349/147 |
| 5,717,475 A | * | 2/1998 | Kamio et al. ............... 349/147 |
| 5,777,710 A | * | 7/1998 | Okada et al. ............... 349/138 |
| 6,219,125 B1 | * | 4/2001 | Ishikura et al. ............. 349/147 |
| 6,266,121 B1 | * | 7/2001 | Shigeta et al. ............. 349/156 |

FOREIGN PATENT DOCUMENTS

| EP | 0788013 | 8/1997 |
| JP | 8-76134 | 3/1996 |
| WO | 9503684 | 2/1995 |

OTHER PUBLICATIONS

Search Report for British Application GB 9921480.01 mailed Nov. 2, 1999.
S. Poon et al., "High Density Multilevel Copper–Polyimide Interconnects" NEPCON West '89, pp. 426–448.
N. Iwasaki et al., "A Pillar–Shaped via Structure in Cu–Polyimide Multilayer Substrate" IEE/CHMT '89 Japan IEMT Symposium, pp. 128–131.

(List continued on next page.)

Primary Examiner—Robert H. Kim
Assistant Examiner—Mike Qi
(74) Attorney, Agent, or Firm—Renner, Otto, Boisselle & Sklar

(57) ABSTRACT

On a transparent substrate, a photosensitive resin layer, which is made of an acrylic positive photosensitive resin layer, is formed so as to cover stripe-shaped conductive wires and a portion between the conductive wires. In this case, at least a part of the photosensitive resin layer, that covers the conductive wire, is removed. And then, a transparent conductive film is formed on the photosensitive resin layer and the conductive wire, and the transparent conductive film is patterned so as to form transparent electrodes. Such an electrode substrate can obtain high evenness when a height difference is at 0.11 μm or less between a projecting portion, which appears on the photosensitive resin layer around the ends of the conductive wires after the photosensitive resin layer has been removed so as to expose the conductive wire, and the virtually even surface of the resin film at a portion where the conductive wire is not formed, and a height difference is 0.11 μm or less between the projecting portion and the surface of the conductive wire. Consequently, it is possible to improve evenness of the electrode substrate in which the conductive wires are formed so as to be conductively contact with the transparent electrodes on the insulating layer.

31 Claims, 17 Drawing Sheets

OTHER PUBLICATIONS

H. Nagayama et al., "A New Process for Silica Coating" Solid–State Science and Technology, vol. 135, No. 8, Aug. 1988, pp. 2013–2016.

N.A. Clark et al., "Submicrosecond bistable electro–optic switching in liquid crystals" Appl. Phys. Lett., vol. 36, No. 11, Jun. 1980, pp. 899–901.

* cited by examiner

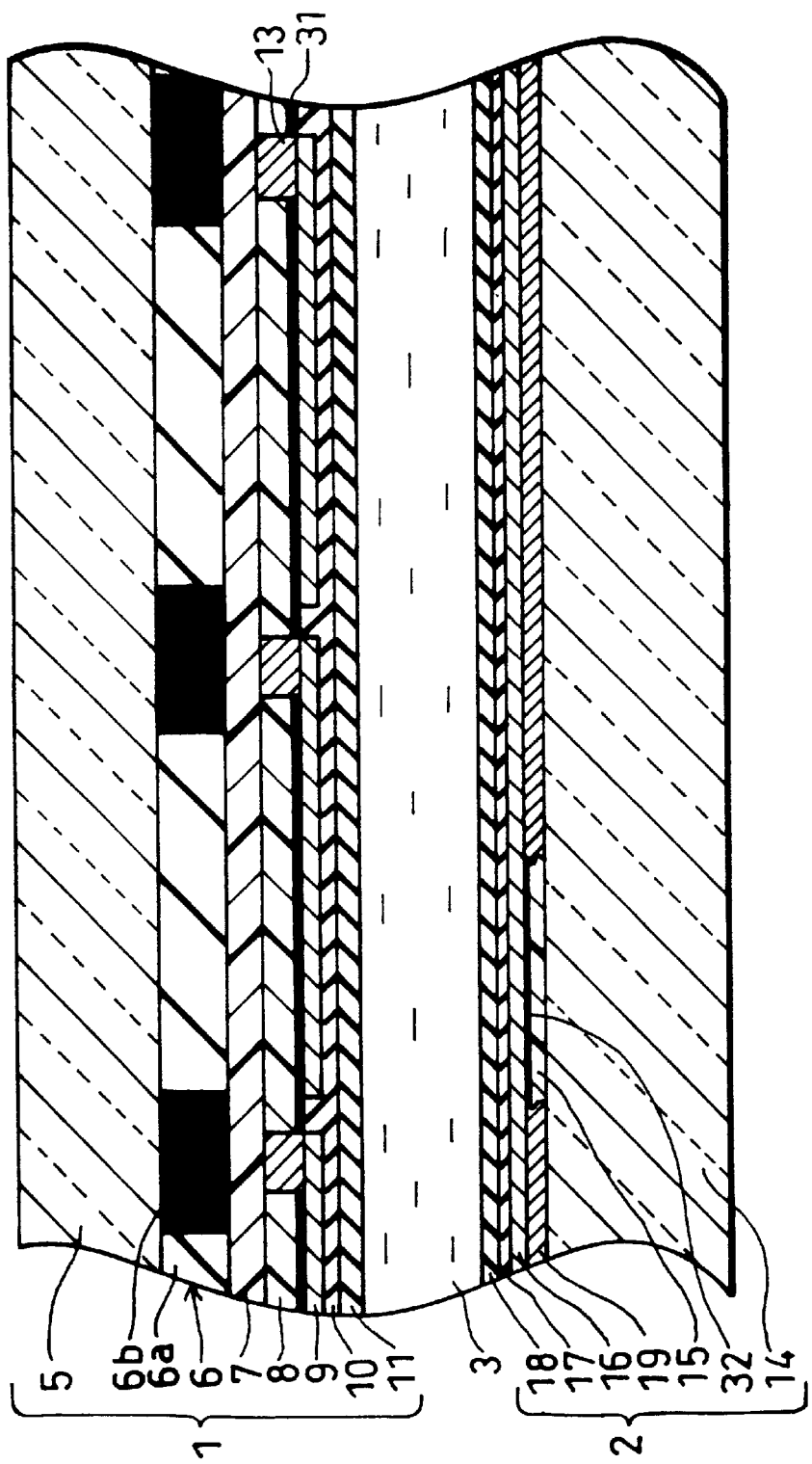

ELECTRODE SUBSTRATE HAVING PARTICULAR PROJECTING PORTION, MANUFACTURING METHOD THEREOF, AND LIQUID CRYSTAL DISPLAY ELEMENT

FIELD OF THE INVENTION

This invention relates to an electrode substrate, in which wires reduce resistance of electrodes for applying voltage to a pixel so as to respond to a large-capacity and high-definition display, and a manufacturing method thereof, and further concerns a liquid crystal display element which is provided with the electrode substrate.

BACKGROUND OF THE INVENTION

Ferroelectric liquid crystal display has superior properties in memory, fast response, and a wide viewing angle. In addition, as for a liquid crystal display device using ferroelectric liquid crystal, when direct matrix method is adopted, in which stripe scanning electrodes and signal electrodes made of transparent conductive films are arranged in a matrix form on a substrate, it is possible to provide a display with a large capacity and high definition as compared with a TN(Twisted Nematic) and an SNT(Super-Twisted Nematic) liquid crystal display devices that also adopt a direct matrix method. This advantage of ferroelectric liquid crystal is described in "Applied Physics Letters 36, (1986) p.899–901" by N. A. Clark and S. T. Lagerwall.

However, as for ferroelectric liquid crystal adopted for a direct matrix method, when merely a transparent conductive film is used for forming the stripe electrodes so as to manufacture a ferroelectric liquid crystal display device having a large capacity and high definition, it is necessary to form long stripe electrodes in accordance with a wider display area, resulting in larger resistance on electrodes. Consequently, problems such as heat, delay of a signal, and a deformed waveform of a signal applied to a pixel area, tend to occur and affect a drive.

The conventional TN and STN liquid crystal display devices form a high contrast screen by adopting a plurality of frame scans which use a multiplexing drive for periodically applying driving voltage. Therefore, delay effect, which causes a delay in applying driving voltage, has hardly degraded display quality. However, recently, as for such a liquid crystal display device, in order to respond to the growing needs for a larger screen and faster response, influence of the delay effect cannot be ignored.

For this reason, when a larger screen is provided in the ferroelectric liquid crystal display device, a method has been adopted, in which low-resistance conductive wires such as a metal film are provided for reducing the entire electrode resistance.

The conductive wires are formed so as to conductively come into contact with the stripe electrodes along the length of the stripe electrodes. Meanwhile, as for the ferroelectric liquid crystal cell and the STN liquid crystal cell that need to be manufactured with a small cell gap, evenness on a substrate surface significantly affects liquid crystal alignment. Therefore, as for such a liquid crystal cell, it is necessary to obtain favorable evenness on the substrate. Hence, the conductive wires need to be arranged so as to realize favorable evenness on a substrate.

In order to form such conductive wires, the following four methods have been conventionally adopted:

A first method adopts a abrading operation as described in "NEPCON West '89, p426–p447, 1989". This method forms conductive wires in accordance with the steps of FIGS. 13(a) through 13(c). Firstly, metal wires 103(conductive wires) are formed in stripes on a substrate 101, which is coated with polyimide 102 (FIG. 13(a)). Next, on the substrate 101, an insulating film 104 is formed so as to cover the metal wires 103(FIG. 13(b)). And then, merely bumps of the insulating film 104, that are located on the metal wires 103, are abraded so as to expose the upper surface of the metal wires 103(FIG. 13(c)). Further, a transparent conductive film is formed in stripes on the metal wires 103.

This method makes it possible to increase the thickness of the metal wires 103 as well as to expose the upper surfaces of the metal wires 103 merely by abrading the insulating film 104.

A second method adopts photolithography as described in "IEEE/CHMT '89, Japan IEMT Symposium, p128–131". This method forms conductive wires in accordance with the steps of FIGS. 14(a) through 14(d). The metal wires 103 are formed into stripes on the substrate 101(FIG. 14(a)). Next, negative photoresist(polyimide negative photoresist) is made into a film so as to cover the metal wires 103 on the substrate 101; thus, an insulating film 105 is formed (FIG. 14(b)). And then, the insulating film 105 is partly removed on the metal wires 103 by photolithography which uses a photo mask 106 for exposing the upper surfaces of the metal wires 103 (FIG. 14(c)).

As shown in FIGS. 15(a) and 15(b), the photolithography process adopts the photomask 106 which includes a plurality of small holes 106b on both sides of a stripe pattern 106a. This arrangement makes it possible to remove projecting portions 105a of the insulating film 105, that are located on both sides of the metal wires 103. Consequently, the surface of the insulating film 105 is evenly formed together with the upper surface of the metal wires 103(FIG. 14(d)). The small holes 106b make it possible to adjust the exposure amount so as to soften and remove merely the projecting portions 105a around the metal wires 103.

This method makes it possible to form the thick metal wires 103 in the same manner as the first method. In addition, photolithography exposes the upper surfaces of the metal wires 103.

As disclosed in Japanese Published Unexamined Patent Application No. 76134/1996 (Tokukaihei 8-76134, published on Mar. 22, 1996), a third method forms stripe conductive wires on a transparent substrate and fills UV(ultraviolet)cure resin between the conductive wires. This method forms conductive wires in accordance with the steps of FIGS. 16(a) through 16(d).

Firstly, a smoothing mold 108, which has UV cure resin 107 applied thereon, is disposed so as to oppose the transparent substrate 101 on which the metal wires 103 are formed into stripes(FIG. 16(a)). Next, the UV cure resin 107 is exposed to ultraviolet light from the back of the substrate 101 so as to form an insulating film having the same thickness as the metal wires 103 (FIG. 16(b)). And then, the smoothing mold 108 is separated from the substrate 101 (FIG. 16(c)), and transparent electrodes 109 are formed on the surface of the layer consisting of the metal wires 103 and the UV cure resin 107(FIG. 16(d)).

In this method, in the step of FIG. 16(b), the smoothing mold 108 having the UV cure resin 107 applied thereon is pressed onto the substrate 101 having the metal wires 103 formed thereon, and then, the UV cure resin 107 is exposed to ultraviolet light; therefore, it is possible to achieve a preferable evenness of the insulating film including UV cure resin 107.

As described in "J. Electrochem. Soc.; SOLID-STATE SCIENCE TECHNOLOGY August 1988, p2013–p2016", a fourth method adopts a liquid-phase deposition film forming method(Liquid-phase deposition; LPD) of $SiO_2$ amorphous film. The LPD method uses solution of hydrosilicofluoric acid($H_2SiF_6$:HF), and the chemical equilibrium of the solution is shifted to the deposition side of $SiO_2$ so as to form a film. This method forms conductive wires in accordance with the steps of FIGS. 17(a) through 17(d).

Firstly, a metallic material is formed into a film on the substrate 101(FIG. 17(a)), and the metallic material is patterned by using photoresists 110 so as to form the metal wires 103(FIG. 17(b)). Here, after the patterning operation, the photoresists 110 are not removed. And then, $SiO_2$ films 111 are formed between the metal wires 103 by using the LPD method(FIG. 17(c)), the photoresists 110 are exfoliated from the metal wires 103(FIG. 17(d)). This method makes it possible to provide an even construction which has no projection or groove on the metal wires 103 and the $SiO_2$ films 111.

However, it is difficult to put the above-mentioned methods into practical use due to the following disadvantages:

The first method cannot evenly abrade the insulating film 104. For example, portions between the metal wires 103 tend to be abraded as compared with portions disposed on the metal wires 103. Namely, the first method exposes the upper surfaces of the metal wires 103 merely by abrading. However, in order to abrade merely the insulating film 104 on the metal wires 103, an abrading member having superior evenness needs to be contact merely with the insulating film 104 on the metal wires 103. Additionally, if abrasive is used as an abrading member, the insulating film 104 is abraded between the metal wires 103 while the insulating film 104 is abraded on the metal wires 103, resulting in a concave surface between the metal wires 103. Therefore, it is not possible to uniformly abrade the insulating film 104 so as to achieve an even surface.

In the second method, the metal wires 103 formed in stripes, a polyimide negative photosensitive resin is formed into a film as the insulating film 105, and photolithography using the photomask 106 exposes the upper surfaces of the metal wires 103. In this case, the small holes 106b are formed on the photomask 106 so as to remove the projecting portions 105a of the insulating film 105 around the metal wires 103. However, in the second method, the small holes 106b control the exposure amount so as to adjust a film thickness of the hardening insulating film 105; thus, it is always necessary to stabilize the exposure amount. Particularly, this methods uses a negative photosensitive resin, so that the exposure amount must not be excessive. In addition, as disclosed in the aforementioned "IEEE/CHMT '89, Japan IEMT Symposium", the insulating film 105 has a thickness of 25 $\mu$m and the projecting portions 105a have height h of nearly 3 $\mu$m. This method is not a method for forming electrodes of a ferroelectric liquid crystal cell; therefore, the insulating film 105 has a film thickness larger than an insulating film of the ferroelectric liquid crystal cell, so that the projecting portions 105a are higher. Hence, it is understood that the second method has accuracy of merely about 3 $\mu$m for removing the projecting portions 105a.

As for the third method, in order to prevent air bubbles from entering the UV cure resin 107, it is necessary to press the substrate 101 onto the smoothing mold 108 under a reduce pressure(vaccum chamber) in a decompression chamber. Further, a drive is required for pressing the smoothing mold 108 onto the substrate 101. Additionally, this method requires the smoothing mold 108 to be washed for each use. Thus, this method has a drawback of such a complex manufacturing process.

As for the fourth method, the metal wires 103 need to have chemical resistance against hydrofluoric acid; thus, materials for forming the metal wires 103 are limited. Further, in LPD method, the film forming speed, 300 Å/h, is extremely low, so that forming a 1 $\mu$m thickness film demands 30 hours. Moreover, in this method, a chemical reaction forms a film, so that the film forming speed is affected by concentration of each ingredient of the silicofluoride solution. Therefore, upon forming the $SiO_2$ film 111, it is necessary to strictly control the concentration of the hydrosilicofluoric acid solution.

SUMMARY OF THE INVENTION

The present invention is devised in order to overcome the above-mentioned problems. The objective is to manufacture an electrode substrate in which dielectric wires are formed so as to conductively come into contact with transparent electrodes on an insulating film, in a practical manner, and to provide an electrode substrate which has superior evenness.

In order to achieve the above objective, the electrode substrate of the present invention, which includes a plurality of conductive wires formed on the substrate, a resin film formed between the conductive wires, and an electrode film formed on the conductive wires so as to be conductively contact with the conductive wires, is characterized in that a height difference is 0.11 $\mu$m or less between (a) projecting portions formed on the resin film around the ends of the conductive wires and (b) the virtually even surface of the resin film at a portion where the conductive wire is not formed; and a height difference is 0.11 $\mu$m or less between the projecting portion and the surface of the conductive wire.

In the above arrangement, it is desirable that no projecting portion appear around the side ends of the conductive wire, regardless whether a thickness of the resin film is larger or smaller than that of the conductive wire at a portion where the conductive wire is not formed. However, when a height difference is 0.11 $\mu$m or less, more preferably 0.1 $\mu$m or less, or particularly preferable 0.05 $\mu$m or less between the virtually even surface and the projecting portion of the resin film, it is possible to obtain sufficiently high evenness on the resin film. Further, when a height difference is 0.11 $\mu$m or less, preferably 0.1 $\mu$m or less, or particularly preferable 0.05 $\mu$m or less between the projecting portion and the surface of the conductive wire, it is possible to obtain sufficiently high evenness between the resin film and the conductive wire. Therefore, when the electrode substrate of the present invention is, for example, adopted for a liquid crystal display element, it is possible to obtain high evenness for the films formed on the electrode film; thus, the liquid crystal alignment and the switching property can be favorably maintained. Consequently, it is possible to achieve a property which provides high-contrast and even display.

As a result of diligent consideration given by the inventor of the present application, if the metal wires 103 are formed in the ferroelectric liquid crystal cell by using the above-mentioned second method, the height h of the projecting portions 105a, that are disposed around the metal wires 103, depends upon a thickness of the insulating film 105(equals to a thickness of the metal wires 103) and is around 0.5 $\mu$m at the maximum. Further, a thickness of the metal wire 103, that is found by a resistance value, is about 1 to 3 $\mu$m. In order to allow the metal wires 103 and the insulating film 105 to form an even surface, it is necessary to work the insulating film 105(insulating film 105 around the metal wires 103), which has a thickness of 1.5 to 3.5 $\mu$m including the projecting portions 105a having the height h of 0.5 $\mu$m, so as to remove the projecting portions 105a and have the film thickness of 1 to 3 $\mu$m.

However, as described above, the second method has accuracy of nearly 3 $\mu$m for removing the projecting portions 105a; thus, it is understood that it is difficult to cure the insulating film 105 with a thickness of 1 to 3 $\mu$m and to remove merely the projecting portions 105a having the height h of 0.5 $\mu$m while curing the insulating film 105 with a thickness of 1 to 3 $\mu$m. Therefore, even when the photomask 106 having the small holes 106b are used, there is a possibility that the ferroelectric liquid crystal element fails to achieve desired evenness on the substrate. Meanwhile, the present invention makes it possible to provide an electrode substrate, which achieves high evenness and obtains a liquid crystal element having the above-mentioned property, in a positive and stable manner.

In order to achieve the above objective, the manufacturing method of the electrode substrate of the present invention is characterized by including the following steps:

(1) a first step for forming a plurality of conductive wires on the substrate, (2) a second step for forming the resin film so as to cover the conductive wires and portions between the conductive wires on the substrate where the conductive wires are formed, (3) a third step for removing portions of the resin film that cover the conductive wires so as to expose at least a part of the surface of the conductive wire, (4) a fourth step for partially removing projecting portions which appear on the resin layer around the ends of the conductive wires due to the exposure of the conductive wires so as to set a height difference at 0.11 $\mu$m or less between the projecting portion and the virtually even surface of the resin film at a portion where the conductive wire is not formed, and to set a height difference at 0.11 $\mu$m or less between the projecting portion and the surface of the conductive wire, and (5) a fifth step for forming an electrode film which is formed on the resin film and the conductive wires so as to be conductively contact with the conductive wires.

With the above-mentioned method, upon partially exposing the surface of the conductive wires in the third step, the projecting portions, which appear on the resin layer around the ends of the conductive wires due to the exposure of the conductive wires, are partially removed so as to set a height difference at 0.11 $\mu$m or less between the projecting portion and the virtually even surface of the resin film where the conductive wires are not formed, and to set a height difference at 0.11 $\mu$m or less between the projecting portion and the surface of the conductive wire; thus, high evenness can be achieved on the surface of the resin film and between the surface of the resin film and the surface of the conductive film. Hence, in the fifth step, it is possible to form the electrode film in a virtually even manner on the resin film and the conductive wires.

Therefore, when the electrode substrate manufactured in the above steps is adopted for the liquid crystal display element, it is possible to evenly form the films provided afterwards on the electrode film. Hence, the liquid crystal alignment and the switching property can be maintained in a favorable manner.

Therefore, without a conventional manufacturing method for completely removing the projecting portions of the resin film, the manufacturing method of the electrode substrate of the present invention makes it possible to readily manufacture the liquid crystal display element which is superior in evenness, at low cost in a practical manner.

Furthermore, the above method is more practical and easy because this method forms the resin layer with a thickness smaller or larger than that of the conductive wire, at portions where the conductive wires are not formed.

In order to achieve the above objective, the liquid crystal display element of the present invention, in which liquid crystal is sandwiched between a pair of the electrode substrates opposing each other, is characterized in that at least one of the electrode substrates is the electrode substrate of the present invention.

As described above, the liquid crystal display element adopts an electrode substrate achieving high evenness, so that the alignment and the switching property of the liquid crystal can be favorably maintained.

In order to achieve the above objective, the liquid crystal display element of the present invention, in which liquid crystal is sandwiched between a pair of the electrode substrates opposing each other, is characterized in that at least one of the electrode substrates is formed by using the manufacturing method of the present invention.

As described above, the liquid crystal display element also adopts an electrode substrate achieving high evenness, so that the alignment and the switching property of the liquid crystal can be favorably maintained.

For a fuller understanding of the nature and advantages of the invention, reference should be made to the ensuing detailed description taken in conjunction with the accompanying drawings.

BRIEF DESCRIPTION OF THE DRAWINGS

FIG. 6 is a sectional drawing showing the construction of the liquid crystal display element in accordance with Embodiment 2 of the present invention.

DESCRIPTION OF THE EMBODIMENTS

Embodiment 1

Referring to FIGS. 1(a) through 5 and 11, the following explanation describes one embodiment of the present invention.

Figure 5:
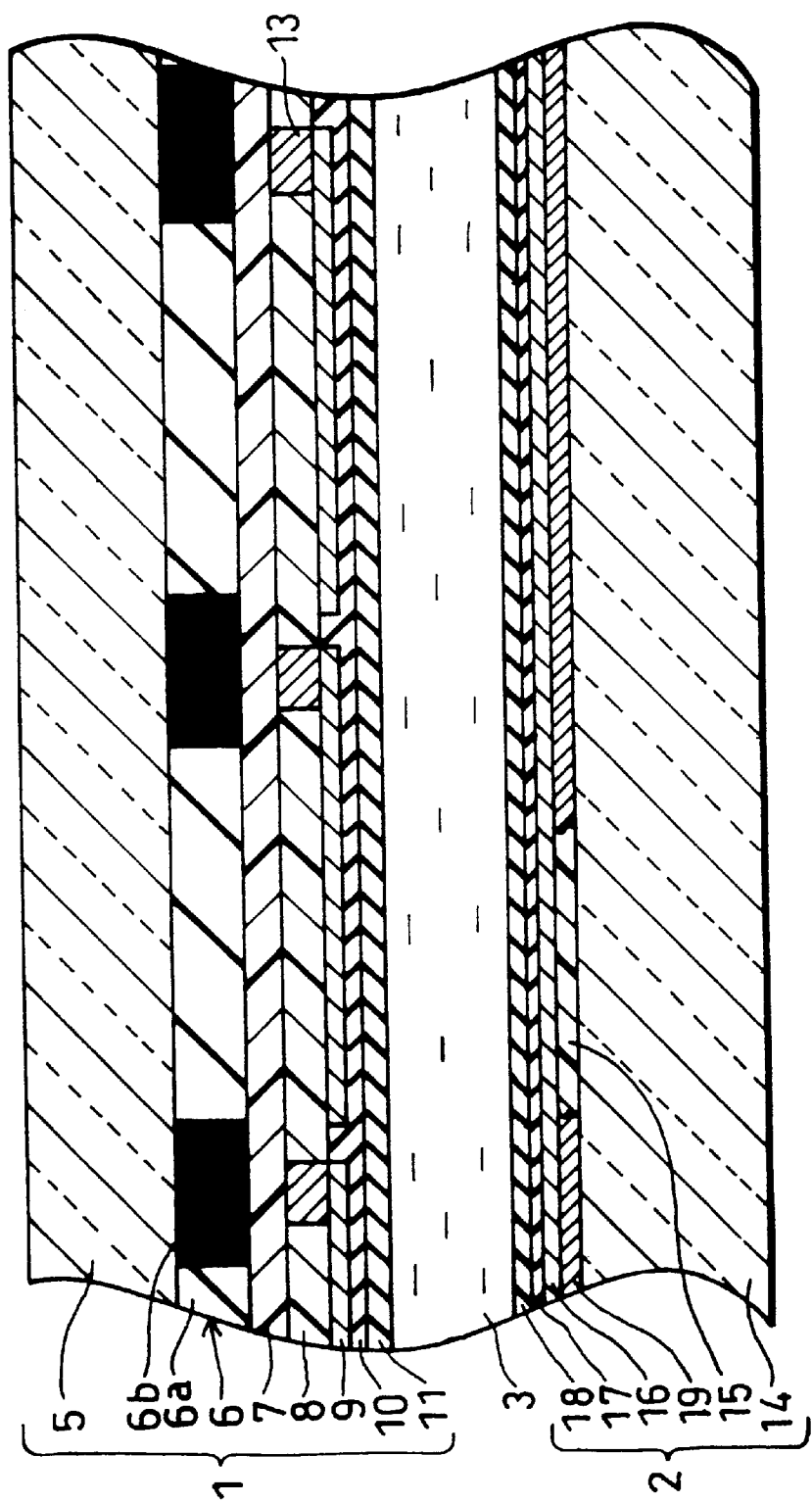
FIG. 5 is a sectional drawing showing the construction of a liquid crystal display element including the electrode substrate.

As shown in FIG. 5, an liquid crystal display element of the present embodiment is provided with electrode substrates 1 and 2, and a liquid crystal layer 3.

The electrode substrates 1 and 2 have wall-shaped spacers (described later) or ball spacers which maintain a predetermined gap between the substrates. And then, a sealing material(not shown) bonds and fixes the substrates at circumferential portions thereof. Further, liquid crystal material such as ferroelectric liquid crystal(antiferroelectric liquid crystal can be also adopted) is filled into a gap between the electrode substrates 1 and 2 so as to form the liquid crystal layer 3. Ferroelectric liquid crystal is superior in fast response and memory, so that it is possible to display an image with a large capacity and high definition. Moreover, on the outer surfaces of the electrode substrates 1 and 2, polarizing boards(not shown), whose deflection axes are arranged so as to intersect each other, are placed so as to sandwich the electrode substrates 1 and 2.

The electrode substrate 1 is provided with a transparent substrate 5, a color filter layer 6, an overcoat film 7, an insulating layer 8, scanning electrodes 9, an insulating film 10, and an alignment film 11.

The transparent substrate 5 is made of transparent material including glass and a transparent resin such as polymethyl methacrylate. The color filter layer 6 is formed on the transparent substrate 5 and consists of color filters 6a and black matrixes 6b disposed between the color filters 6a. In the color filter layer 6, the black matrixes 6b and the red, green, blue color filters 6a are alternately arranged in parallel and come into contact with one another. The overcoat film 7 is made of an acrylic resin material and is disposed so as to cover the color filter layer 6.

The insulating layer 8 is made of acrylic positive photosensitive resin and is formed into stripes on the overcoat film 7. In gaps of the insulating film 8, stripe-shaped conductive wires 13 are provided. The conductive wires 13 are made of low-resistance metallic material such as Cu. Further, the conductive wires 13 may include (a) a adhesion layer made of conductive materials such as ITO, that favorably come into adhere to the overcoat film 7 and the metallic materials and (b) a layer made of the metallic materials.

Additionally, in the electrode substrate 2, the adhesion layer favorably comes into adhere to the transparent substrate 14.

The scanning electrodes 9 serving as transparent electrodes are made of a transparent conductive material such as ITO and are formed into stripes in parallel on the color filter layer 6. Further, on the conductive wires 13, the scanning electrodes 9 are arranged so as to be conductively contact with the conductive wires 13 in a respective manner.

The insulating film 10 is made of an insulating material selected from SiO$_2$(silicon oxide) and SiN(silicon nitride) and is arranged so as to cover the scanning electrodes 9.

The alignment film 11 is made of high polymeric organic substances such as polyimide, nylon, and polyvinyl alcohol or made of SiO$_2$ rhombic evaporation film on the insulating film 10. The alignment film 11 is subjected to a uniaxial operation such as a rubbing operation. For example, when the alignment film 11 is made of high polymeric organic substance, an alignment operation is performed so as to align liquid crystal molecules in parallel with the electrode substrate 1.

Meanwhile, the electrode substrate 2 is provided with a transparent substrate 14, an insulating layer 15, signal electrodes 16, an insulating film 17, and an alignment film 18.

The transparent substrate 14 and the insulating layer 15 are respectively made of the materials used for the transparent substrate 5 and the insulating layer 8. Between the insulating layers 15, stripe-shaped conductive wires 19 are provided so as to have the same arrangement as the conductive wires 13. The signal electrodes 16 serving as transparent electrodes are made of the same conductive materials as the scanning electrodes 9 and are made into stripes in parallel on the insulating layer 15 so as to intersect the scanning electrodes 9. Further, the signal electrodes 16 are arranged on the conductive wires 19 so as to be conductively contact with the conductive wires 19 in a respective manner.

Moreover, in a region where the scanning electrodes 9 and the signal electrodes 16 oppose each other, a pixel region(not shown) is formed. When voltage is applied to the scanning electrodes 9 and the signal electrodes 16, the alignment of ferroelectric liquid crystal molecules varies, so that a display state is changed by a bright display and a dark display.

The insulating film 17 and the alignment film 18 are respectively made of the same materials as the insulating film 10 and the alignment film 11, and are stacked on the signal electrodes 16.

Here, the following explanation discusses manufacturing step of the electrode substrates 1 and 2.

Figure 1A:
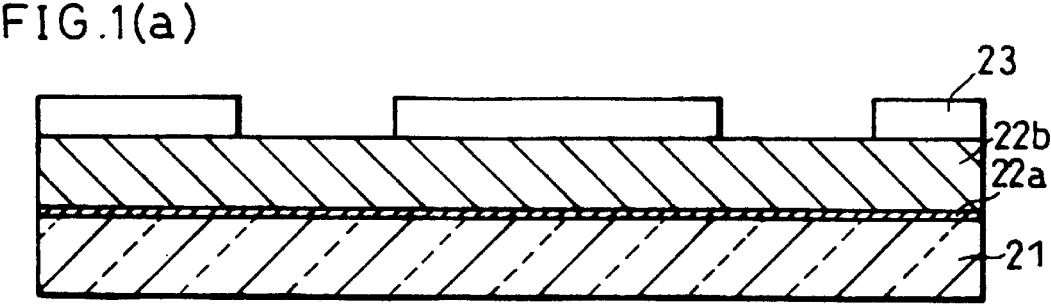
FIGS. 1(a) through 1(e) are sectional drawings showing each step of manufacturing an electrode substrate in accordance with Embodiments 1, 3, 4, and 6 through 11 of the present invention.

Firstly, the overcoat layer 7, which is made of the color filter layer 6 and an acrylic resin, is formed on the transparent substrate 5, and ITO is sputtered with a film thickness of 30 nm by using a sputtering device. Meanwhile, on the transparent substrate 14, ITO is directly sputtered in the same manner with a film thickness of 30 nm. As shown in FIG. 1(a), a ground film 22a is formed on a transparent substrate 21(transparent substrates 5 and 14).

Here, in FIG. 1(a), the color filter layer 6 and the overcoat film 7 are not shown.

And then, Cu is sputtered on the ground film 22a so as to form a metal film 22b serving as a film made of conductive material. In this case, the temperature of the substrate ranges between 100 and 120° C., and the film forming speed ranges 30 to 50 nm/min. Furthermore, in accordance with electric resistance and a width of a conductive wire 22(described later), the evaporation amount of a metal film 22b is controlled so as to set a thickness of the metal film 22b between 1 and 3 μm.

Figure 1B:
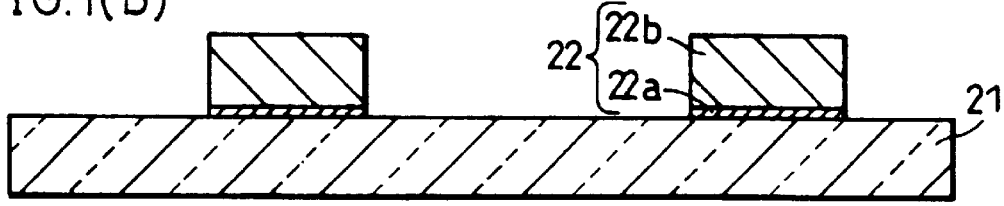

Afterwards, on the ground film 22a and the metal film 22b, photoresist 23 is made into a film as a photosensitive resin by using a roll coater, and the photoresist 23 is patterned into stripes by adopting photolithography using a photomask for forming conductive wires and an ultraviolet exposing device(FIG. 1(a)). Further, the transparent substrate 21 having the ground film 22a and the metal film 22b is dipped into phosphoric acid and acetic acid series etchanto for 10 minutes at room temperature so as to etch the metal film 22b. Furthermore, the ground film 22a is subjected to etching using an argon plasma at 300W for 20 minutes so as to form conductive wires 22(conductive wires 13 and 19) made of ITO and Cu as shown in FIG. 1(b).

When a dry etching method is adopted, it is possible to dispense with an overetching of ITO, that is necessary in a wet etching method, and it is possible to prevent an insufficient etching from short-circuiting a portion between adjacent transparent electrodes 27(described later); consequently, electric leak can be eliminated.

In the above-mentioned manufacturing process, ITO is used as a material for the ground film 22a. Inevitably, other materials can be adopted. For example, it is possible to use a material selected from Ta, Cr, Ni, and Mo, that has superior adhesion for the transparent substrate 21. These materials make it possible to patten the ground film 22a by using the dry etching method in addition to the wet etching method.

Figure 2:
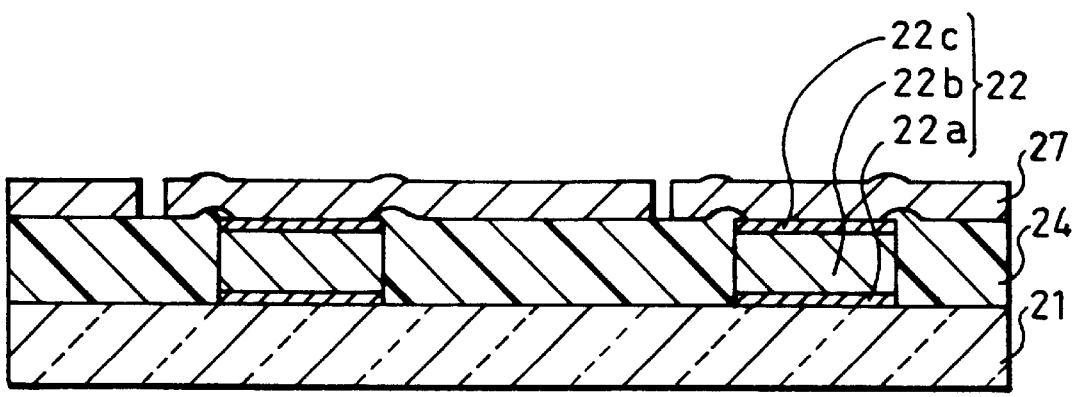
FIG. 2 is a sectional drawing showing the construction of the electrode substrate including the conductive wires of another construction.

Moreover, the above-mentioned example has a double-layer structure. As shown in FIG. 2, it is possible to adopt a triple-layer structure including an antioxidant film 22c which is formed for preventing oxidization of Cu on the metal film 22b made of Cu. As the antioxidant film 22c, it is possible to adopt a metal species selected from Ta, Cr, Ni, and Mo, that are the same materials as the ground film 22a.

The thickness and width of the conductive wire 22 is determined by a resistance value(sheet resistance) which is required for an electrode constituted by a transparent element 27(scanning electrode 9 and signal electrode 16 will be described later) and the conductive wire 22. However, the resistance value varies in accordance with the relationship between a width of the transparent electrode 27 and a thickness and width of the conductive wire 22. For example, when a required resistance value is 0.1Ω/□ and a required width of the transparent electrode 27 is 300 μm, the conductive wire 22 has a thickness of 2 μm and a width of 30 μm.

Here, a material for forming the metal film 22b is not limited to Cu, a material selected from Al, Ag, and Au can be also adopted in view of the resistance value and the manufacturing. However, in view of the cost, etc., Cu and Al are particularly suitable.

Figure 1C:
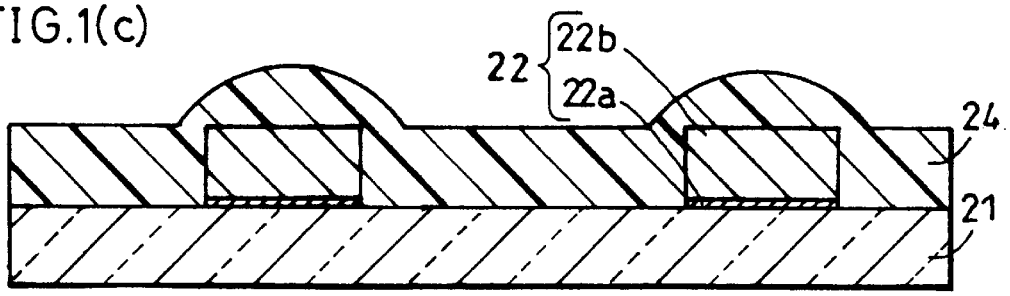

Next, as shown in FIG. 1(c), on the transparent substrate 21 where the conductive wires are formed, an acrylic positive photosensitive resin(HRC series manufactured by JSR Corp.) is made into a film by using a spin coater so as to have a film thickness larger than that of the conductive wire 22, 2 μm, by 0.05 μm; thus, a photosensitive resin layer 24 is formed. And then, the photosensitive resin layer 24 is prebaked at 80° for 10 minutes.

Figure 1D:
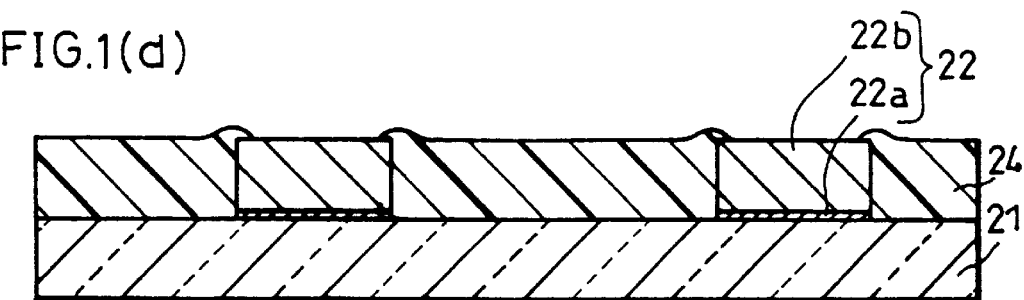
Figure 3A:
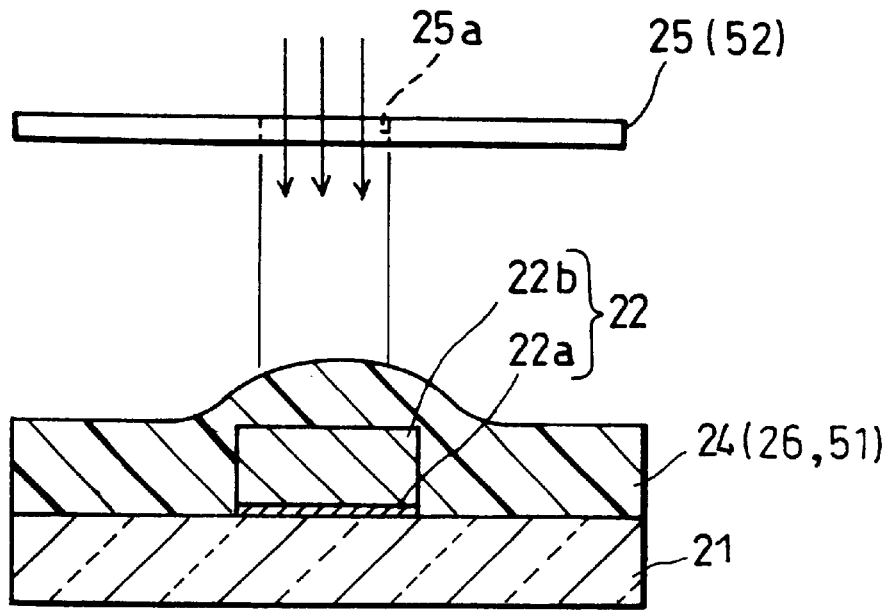
FIGS. 3(a) and 3(b) are sectional drawings showing the step of partially removing an insulating layer made of an acrylic positive photosensitive resin in the process for manufacturing the electrode substrate.
Figure 3B:
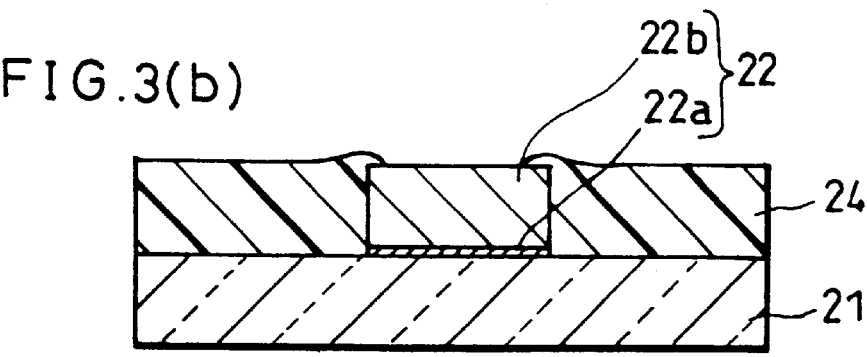

Afterwards, as shown in FIG. 3(a), the photosensitive resin layer 24 is exposed to light by using a photomask 25 having stripe patterns 25a, is developed, and is further post-baked at 200° C. for one hour so as to expose the upper surface of the metal film 22b as shown in FIGS. 1(d) and 3(b). Upon exposure to light, the photomask 25 is disposed at 100 μm from the transparent substrate 21(namely, a mask gap 100 μm), and the position of the photomask 25 is adjusted so as to allow the stripe patterns 25a to correspond to the positions of the conductive wires 22. The exposure amount is set at 250 mJ.

As described above, in the photosensitive resin layer 24, a projecting portion is not removed completely but partially removed on the metal film 22b so as to form an insulating film which has virtually the same height as the metal film 22b.

The photomask 25 has the stripe patterns 25a, each having a width smaller than that of the metal film 22b (30 μm) by 4 μm. Light is transmitted through the stripe patterns 25a. The width of the stripe pattern 25a is set smaller than that of the metal film 22b in order to tolerate an alignment error of the photomask 25, namely, in order to prevent the stripe pattern 25a from being placed out of the metal film 22b.

As shown in FIG. 3(a), the photosensitive resin layer 24 is stacked so as to have an angle shape on the metal film 22b. The photosensitive resin layer 24 has a thickness of 1.0 μm at the center and a thickness of 0.3 μm around both side ends of the metal film 22b. When an acrylic positive photosensitive resin is used in the above-mentioned process, as shown in FIG. 3(b), the photosensitive resin layer 24 is patterned so as to have virtually the same width of the stripe pattern 25a and a smooth surface. Specifically, a height difference $D_2$(see FIG. 11) is 0.1 μm or less between (a)a top of a projecting portion of the photosensitive resin 24, which is formed outward from both side ends of the metal film 22b, namely, the side ends of the adjacent metal films 22b and (b) the surface of the metal film 22b, namely, the surface of the conductive wire 22. A height difference $D_1$(see FIG. 11) is 0.05 μm or less between a top of the projecting portion and a part of the photosensitive resin layer 24 that includes no conductive wire 22 and has virtually an even surface.

Here, the height difference $D_2$ between (a) the projecting portions of the photosensitive resin layer 24 that is formed around the side ends of the metal film 22b and (b) the surface of the conductive wire 22 is found as follows: the substrate surface obtained in the above process is measured for at least more than one pixel in a perpendicular direction regarding the length of the conductive wire 22, by using a height difference measuring device(Tali Step(manufactured by Taylor Hobson)), so that the maximum value of the height difference between the projecting portion and the surface of the conductive wire 22 is measured at the measuring point; and the same measurement is carried out entirely on the substrate so as to find an average value. In the present embodiment, the above measurement is carried out entirely on the substrate, and six points are picked up at random so as to find an average value.

In the same manner, the height difference $D_1$ between the projecting portions and the virtually even surface of the photosensitive resin layer 24 is found as follows: the substrate surface obtained in the above process is measured for at least more than one pixel in a perpendicular direction regarding the length of the conductive wire 22, by using a height difference measuring device(Tali Step(manufactured by Taylor Hobson)), so that the maximum value of the height difference between the projecting portions and the virtually even surface of the photosensitive resin layer 24 is measured at the measuring point; and the same measurement is carried out entirely on the substrate so as to find an average value. In the present embodiment, the above measurement is carried out entirely on the substrate, and six points are picked up at random so as to find an average value.

Hereinafter, in the following embodiments and comparative examples, the height differences $D_1$, $D_2$, $D_3$, and $D_4$ are found as follows: the substrate surface is measured for at least more than one pixel in a perpendicular direction regarding the length of the conductive wire by using the height difference measuring device so as to measure a maximum value of each of the height differences (corresponding height difference among $D_1$, $D_2$, $D_3$, and $D_4$), and the same measurement is carried out for random six points on the substrate so as to find an average value.

Namely, in the present invention, a height difference between (a)the projecting portions of the photosensitive resin layer 24 that is formed around the side ends of the metal film 22b and (b) the surface of the conductive wire 22, and a height difference between the projecting portion and the surface of the conductive_wire are found as follows: regarding a plurality of regions that are randomly chosen(for example, a plurality of pixels that are randomly chosen) on the substrate, the height differences are measured, and the maximum values of the height differences are averaged.

Figure 3C:
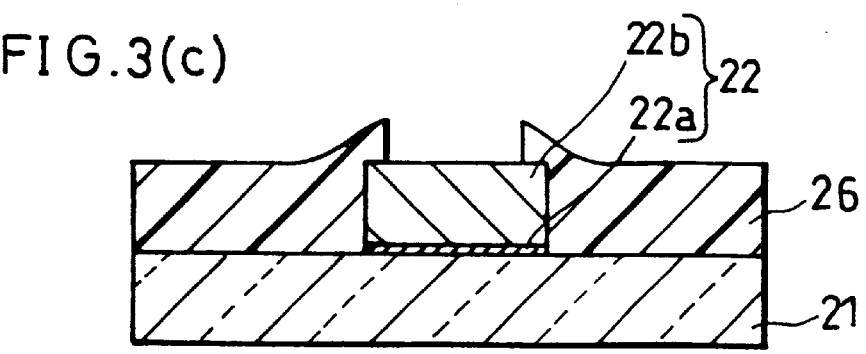
FIG. 3(c) is a sectional drawing showing a state in which the insulating film made of a positive photoresist is partially removed.

Here, instead of the acrylic positive photosensitive resin, when a positive photoresist that is normally used for forming an insulating layer is adopted, as described above, the photoresist layer 26 of FIG. 3(a), that is made of the positive photoresist, is patterned by exposed, developed, and post-baking so as to obtain the construction shown in FIG. 3(c). Specifically, the photoresist layer 26 is patterned so as to have virtually the same width of that of the stripe pattern 25a and around the both side ends of the metal film 22b, a part of the photoresist layer 26 is formed so as to rise in a virtually perpendicular manner with a height of 0.3 μm. When a part of the insulating layer rises perpendicularly, a transparent electrode formed thereon largely projects; consequently, liquid crystal alignment tends to be adversely effected.

As described above, the shape of the insulating layer varies depending upon a material(resin), because the form dramatically varies due to a post-baking performed after exposure and development. Namely, during a post-baking, the acrylic positive photosensitive resin tends to change the shape as compared with the positive photoresist. Therefore, in the insulating layer, the acrylic positive photosensitive resin makes it possible to reduce the projecting portions in size at and around the side ends of the metal wires 22 and to improve the evenness of the insulating layer.

Here, in the above example, the positive acrylic photosensitive resin is adopted; however, a negative resin is also acceptable if the resin greatly changes the shape during a post-baking.

Next, after the step of FIG. 1(d), the substrate is dipped into 2% hydrochloric acid for 10 minutes so as to remove an oxidized film and a remaining resin thin film on the conductive wires 22. As a result, the conductive wires 22 and the transparent electrodes 27(described later) are allowed to electrically come into sufficient contact with each other.

Figure 1E:
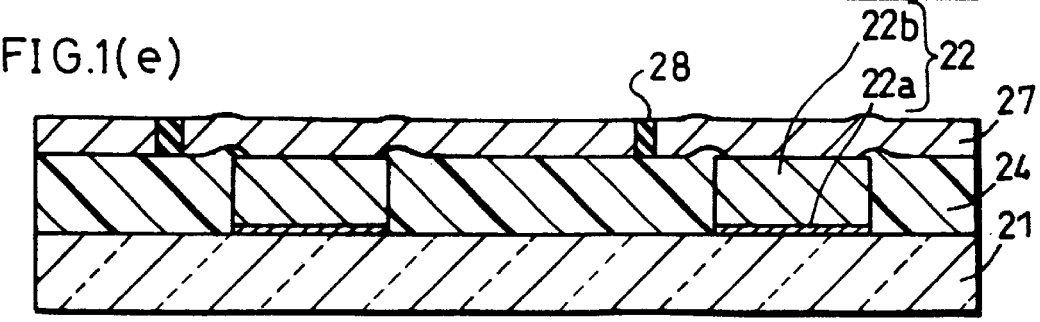

And then, on the insulating layer which is made of the photosensitive resin layer 24 and is patterned as described above, a transparent conductive film made of ITO is formed by using a sputtering device, and the transparent conductive film is subjected to a photolithography and an etching operation by using photoresist. As shown in FIG. 1(e), the stripe-shaped transparent electrodes 27 are formed so as to conductively come into contact with the conductive wires 22. In this case, it is desirable to pattern the transparent conductive film so as to allow the transparent electrode 27 to entirely cover the conductive wire 22. Upon forming the insulating films 10 and 17 which cover the transparent electrodes 27, this arrangement makes it possible to allow the transparent electrodes 27 to protect the conductive wires 22.

Next, Si is formed into a film with the same film thickness as the ITO by a sputtering operation using a sputtering device. The Si film on the transparent electrodes 27 is lifted off together with the photoresist so as to form smoothing portions made of Si between the transparent electrodes 27. The smoothing portions 28 are provided for eliminating a height difference between the transparent electrodes 27 and the photosensitive resin layer 24.

Successively, on the conductive wires 22, the insulating films(insulating films 10 and 17) made of $SiO_2$ and the alignment films(alignment films 11 and 18) made of polyimide are formed in this order. And the alignment film is subjected to a uniaxial aligning operation by rubbing.

Figures 4A, 4B:
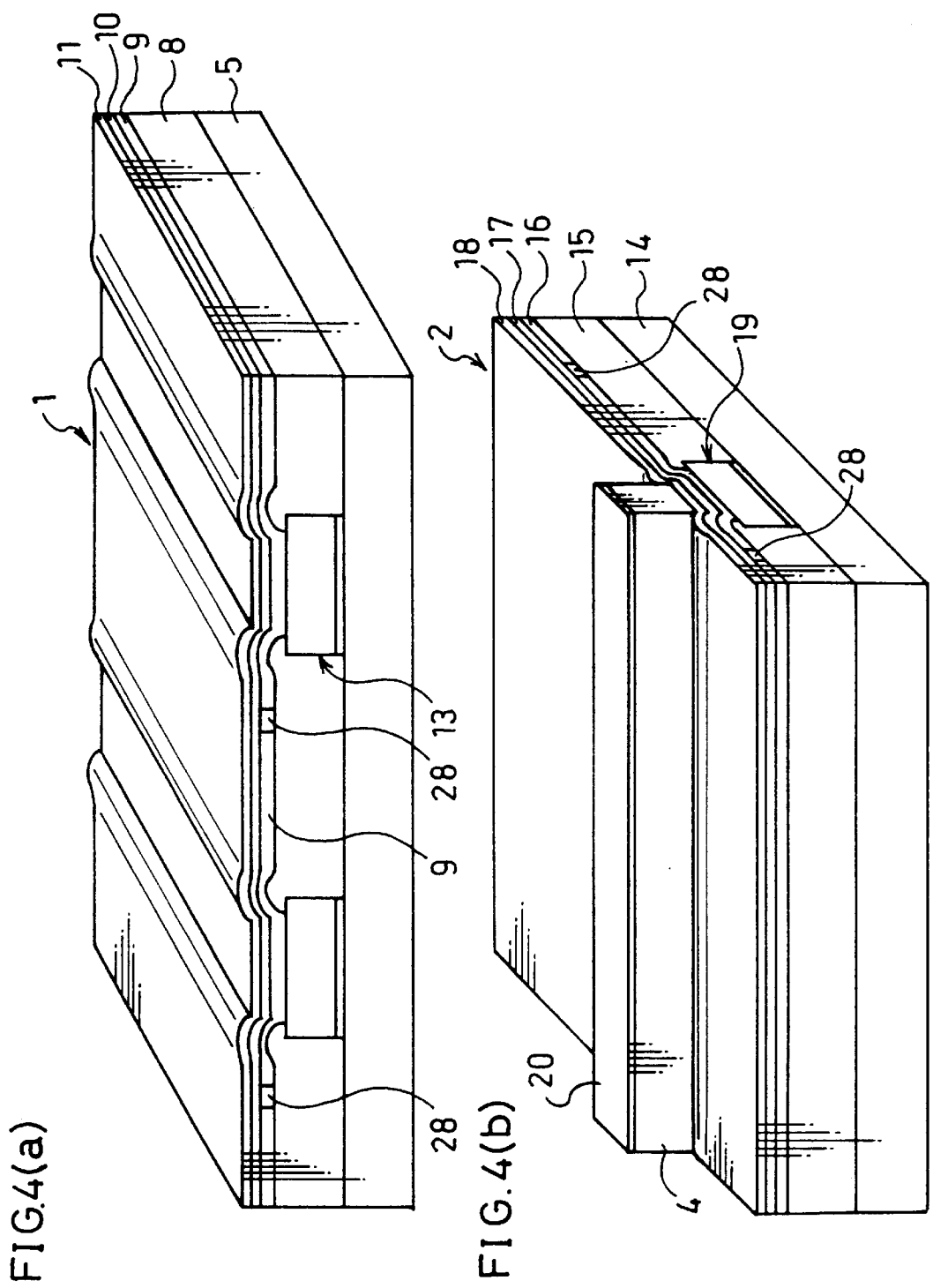
FIGS. 4(a) and 4(b) are perspective views showing the construction of two electrode substrates manufactured in the steps of FIGS. 1(a) through 1(e).

The electrode substrates 1 and 2 shown in FIGS. 4(a) and 4(b) are manufactured in the above-mentioned process. Here, in FIG. 4(a), the color filter layer 6 and the overcoat film 7 are omitted for convenience of explanation.

The electrode substrate 2 has wall-shaped spacers 4 in parallel with the length of the signal electrode 16 on the alignment film 18 in order to maintain a certain cell gap the spacer 4 is disposed above the conductive wire 19 so as not to shield light transmission in a part of the signal electrode 16 where a pixel area is formed. Further, on the upper surface of the spacer 4, adhesive is applied with a thickness of nearly 0.1 to 0.2 μm so as to form an adhesive layer 20.

And then, the electrode substrates 1 and 2 are arranged so as to oppose each other while the scanning electrodes 9 and the signal electrodes 16 intersect one another. In this state, the electrode substrates 1 and 2 are bonded to each other at the adhesive layer 20 and a sealing material applied to circumferential portions of the substrates. And then, ferroelectric liquid crystal is filled between the substrates 1 and 2 so as to achieve the liquid crystal layer 3.

As for the liquid crystal display element manufactured in the above-mentioned process, when driving voltage is applied to the scanning electrodes 9 and the signal electrodes 16, no short is caused between the electrodes and little deformation appears on a waveform of a signal applied to the pixel area. In addition, the substrate surface achieves high evenness so as to evenly align ferroelectric liquid crystal; consequently, it is possible to realize a high-contrast display.

Further, upon examining the effect of external pressure on the alignment, the surface of the liquid crystal display element is pressed with a variety of pressures by using a pressing device including a pressing section whose top portion is round, and then, it is found that an uneven alignment appears at a pressure of 25 kg/cm$^2$, as shown in Table 1. Namely, the liquid crystal display element of the present invention is provided with sufficient alignment stability against external pressure, so that no inconvenience occurs in practical use.

Moreover, in the above methods for manufacturing the electrode substrates 1 and 2, an acrylic positive photosensitive resin is formed into a film by using a spin coater, so that it is possible to form the photosensitive resin layer 24 in a short time. Additionally, heating operations such as prebaking and post-baking, that are performed for partially removing the photosensitive resin 24, require a shorter time as compared with the LPD method which forms an $SiO_2$ film. Moreover, in order to form the conductive wires 22 and the even photosensitive resin layer 24(insulating layer), the electrode substrates are manufactured by adopting the photolithography and etching methods, which are generally used for manufacturing the electrode substrates; therefore, the process of manufacturing the electrode substrates does not become complicated.

Embodiment 2

Referring to FIGS. 6 through 9(a), FIGS. 9(b), and 11, the following explanation describes a second embodiment of the present invention. Here, for convenience of explanation, those members that have the same functions and that are described in Embodiment 1 are indicated by the same reference numerals and the description thereof is omitted.

As shown in FIG. 6, a liquid crystal display element of the present embodiment has the same construction as that of the liquid crystal element of Embodiment 1 except that a protecting film 31 is formed on an insulating layer 8 of an electrode substrate 1 and a protecting film 32 is formed on an insulating layer 15 of an electrode substrate 2. In the electrode substrates 1 and 2, the protecting films 31 and 32 are respectively provided for protecting the insulating layers 8 and 15 and are made of insulating materials selected from $SiO_2$ and SiN. Further, the insulating layers 8 and 15 are made of silicon resins.

The following explanation describes the manufacturing of the electrode substrates 1 and 2.

Figure 7A:
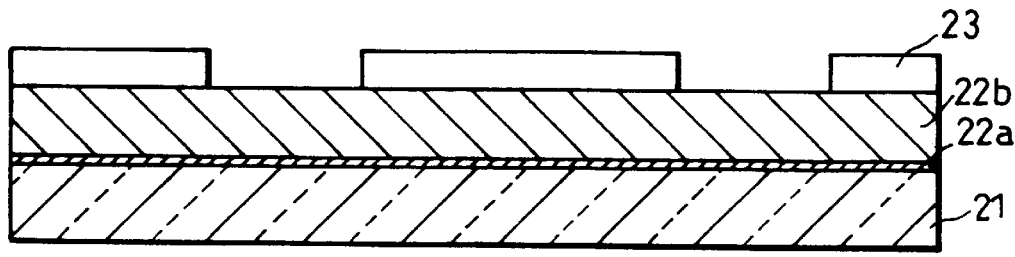
FIGS. 7(a) through 7(e) are sectional drawings showing each step of manufacturing the electrode substrate in accordance with Embodiments 2 and 5 of the present invention.
Figure 7B:
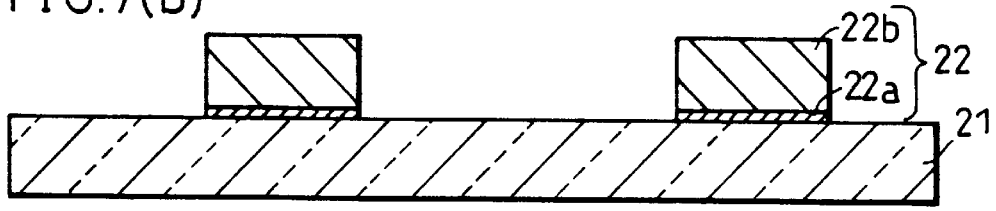

Firstly, as shown in FIGS. 7(a) and 7(b), a conductive wire 22 is formed on a transparent substrate 21. The process is the same as that of FIGS. 1(a) and 1(b).

Figure 7C:
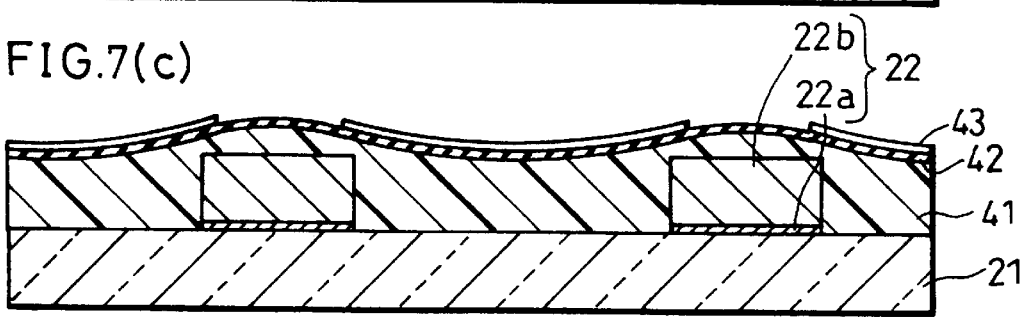

As shown in FIG. 7(c), an acrylic resin is formed by using a spin coater on the transparent substrate 21, where the conductive wires 22 are formed, with a thickness larger than 2 $\mu$m of the conductive wire 22 by 0.05 $\mu$m, so that a resin layer 41 is formed. And then, the resin layer 41 is prebaked at 80° C. for five minutes and is post-baked at 240° C. for one hour. Further, $SiO_2$ is formed into a film with a thickness of 300 to 1000 Å on the resin layer 41(resin film) by using a sputtering device so as to form an $SiO_2$ film 42 serving as a protecting film. The $SiO_2$ film 42 acts as a mask in a dry etching using oxygen plasma(oxygen plasma etching, described later). Namely, in the step for removing the resin layer 41, for example, when the dry etching is used, it is possible to protect portions which do not need to be removed on the resin layer 41.

Next, a positive photoresist 43 is formed into a film on the $SiO_2$ film 42 by using a roll coater and is exposed by using the same photomask(not shown) as a photomask 25(see FIG. 3) of Embodiment 1. In this case, the photomask is disposed at 100 $\mu$m from the transparent substrate 21, and the position of the photomask is adjusted so as to allow the stripe patterns to correspond to the conductive wires 22.

Like the photomask 25, the photomask used in this case has a stripe pattern whose width is smaller than that of a metal film 22b (30 $\mu$m) by 4 $\mu$m. Therefore, the metal film 22b can be exposed so as not to place the stripe pattern out of the metal film 22b.

Figure 8A:
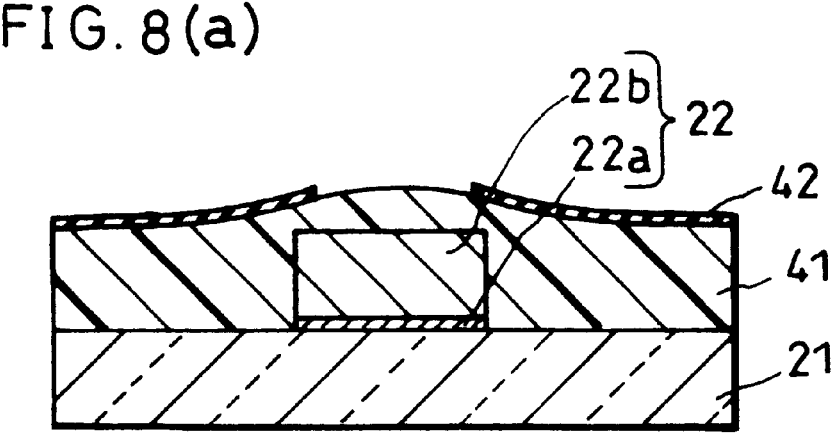
FIGS. 8(a) through 8(d) are sectional drawings showing the detail of the step for partially removing the insulating layer made of an acrylic resin in the process for manufacturing the electrode substrate of FIGS. 7(a) through 7(e).

After exposure, the positive photoresist 43 is developed and post-baked. In this case, the post-baking is carried out at 130° C. for 20 minutes. And then, the transparent substrate 21 is dipped into 1% hydrofluoric acid solution so as to perform an etching operation on the $SiO_2$ film 42. As shown in FIG. 8(a), this step removes the upper portion of the $SiO_2$ film 42, that is disposed on the conductive wire 22.

Figure 7D:
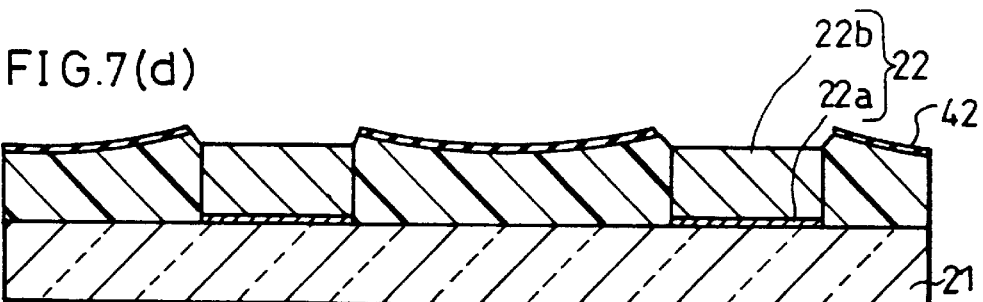

Afterwards, the resin layer 41 is subjected to a dry etching operation, from a portion where $SiO_2$ film 42 is removed to the upper surface of the conductive wire 22, by using an oxygen plasma etching. This step exposes the upper surface of the conductive wire 22 as shown in FIG. 7(d).

Here, the oxygen plasma etching operation is fully described.

Figure 8B:
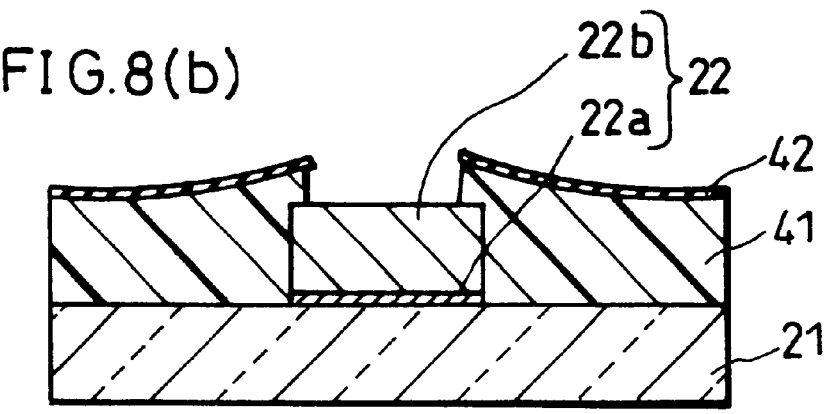

Firstly, upon completion of the patterning of the $SiO_2$ film 42 shown in FIG. 8(a), the oxygen plasma etching is performed with the output of 300W for 10 minutes, and the resin layer 41 is etched to the upper surface of the conductive wire 22. As shown in FIG. 8(b), the resin layer 41, which is covered with the $SiO_2$ film 42, is etched slightly to the inside from the patterned portion of the $SiO_2$ film 42.

Figure 8C:
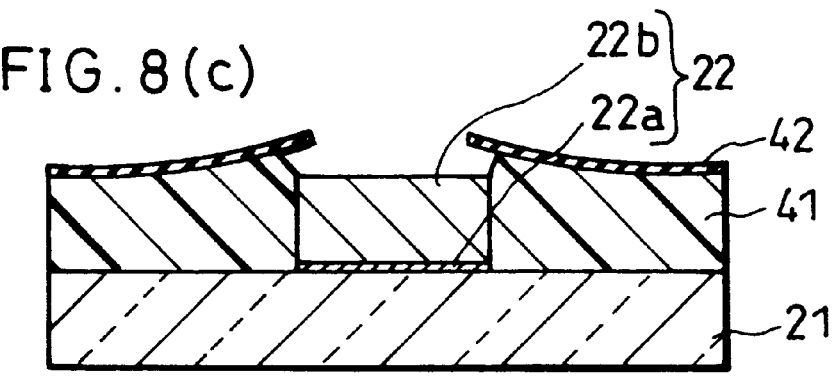

Furthermore, the oxygen plasma etching is continued with the same output for 5 to 10 minutes, so that the oxygen plasma etching is isotropically carried out; thus, the resin layer 41 covered with the $SiO_2$ film 42 is further etched from the state of FIG. 8(b). Namely, acrylic resin, which remains on the upper surface of the conductive wire 22, is etched, and the resin layer 41 is also etched from the center to the both side ends of the conductive wire 22. Consequently, as shown in FIG. 8(c), the acrylic resin is etched approximately 2 to 3 $\mu$m around the ends of the patterned portion of the $SiO_2$ film 42.

Figure 8D:
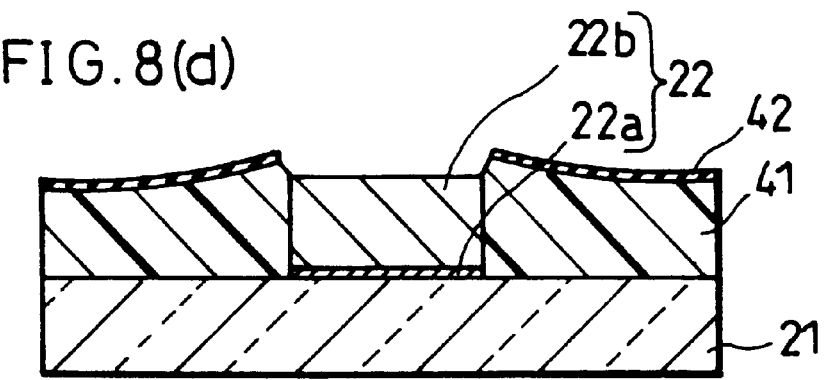

This step removes the entire acrylic resin on the conductive wire 22 and removes the acrylic resin projecting around the side ends of the conductive wire 22. Further, a part of the resin layer 41 that is covered with the $SiO_2$ film 42 is removed as described above, so that the $SiO_2$ film 42 disposed above loses the support; thus, the $SiO_2$ film 42 is also removed as shown in FIG. 8(d).

The resin layer 41 can be removed(dry etching) by using an oxygen ion etching instead of the oxygen plasma etching. The oxygen ion etching can etch the resin layer 41 in the same manner as the oxygen plasma etching. As described above, the oxygen plasma etching and the oxygen ion etching are used so as to readily remove the resin layer 41, even if the resin layer 41 is made of non-photosensitive silicon resin.

$SiO_2$ has resistance against oxygen plasma etching and oxygen ion etching, so that the $SiO_2$ film 42 can be used as a mask for etching. Therefore, it is not necessary to provide another mask for etching. As described later, the above-mentioned effect can be used in a construction in which SiN is made into a protecting film.

The above etching operation largely removes a portion projecting from the even surface so as to achieve a favorable evenness. Upon measuring height difference values($D_1$ and $D_2$ shown in FIG. 11) of the surface of the substrate manufactured in the above-mentioned process, it is found that the values are virtually the same as that of the substrate of Embodiment 1. As described above, the above substrate has virtually the same surface as the substrate of Embodiment 1.

Figure 7E:
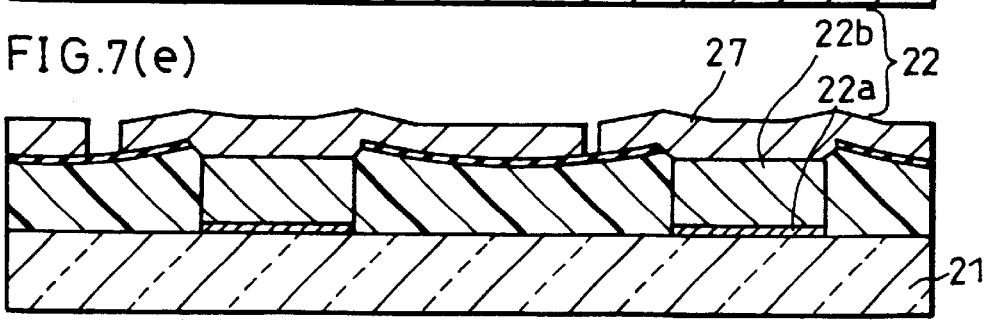

And then, a transparent conductive film made of ITO is formed on the $SiO_2$ film 42 and the conductive wires 22, and the transparent conductive film is subjected to photolithography using a photoresist and an etching operation. As shown in FIG. 7(e), this step forms stripe-shaped transparent electrodes 27 which conductively come into contact with the conductive wire 22.

The $SiO_2$ film 42 is etched and the transparent conductive film is formed in the same vacuum chamber in a successive manner. This arrangement makes it possible to reduce time in both processes.

In the same manner as Embodiment 1, the following step manufactures a liquid crystal display element. Namely, insulating films(insulating films 10 and 17) and alignment films(alignment films 11 and 18) are formed on the conductive wires 22 in this order, and the alignment film is subjected to a uniaxial alignment operation by rubbing.

Figures 9A, 9B:
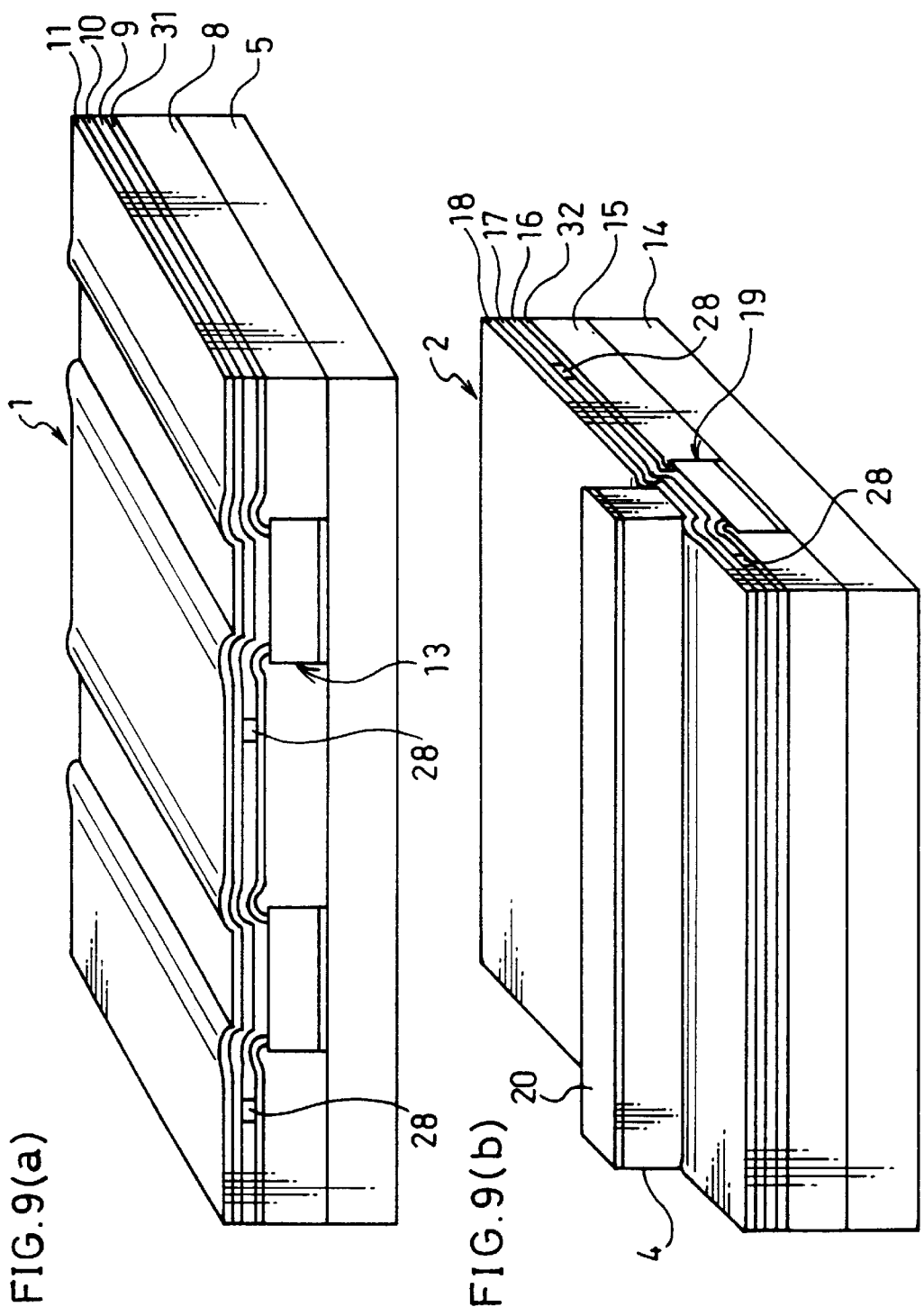
FIGS. 9(a) and 9(b) are perspective views showing two electrode substrates manufactured in the steps of FIGS. 7(a) through 7(e).

The above step manufactures the electrode substrates 1 and 2 shown in FIGS. 9(a) and 9(b). Here, for convenience of explanation, FIG. 9(a) omits a color filter layer 6 and an overcoat film 7.

In the electrode substrate 2, spacers 4 are formed on the alignment film 18 in the same manner as the electrode substrate 2 of Embodiment 1. The electrode substrates 1 and 2 oppose each other so as to allow scanning electrodes 9 and signal electrodes 16 to intersect one another, and the electrode substrates 1 and 2 are bonded to each other with a sealing material and the adhesive layer 20 that are applied at circumferential portions of the substrates. And then, ferroelectric liquid crystal is filled between the substrates 1 and 2 so as to form a liquid crystal layer 3.

As for the liquid crystal display element manufactured in the above-mentioned process, driving voltage is applied to the scanning electrodes 9 and the signal electrodes 16 no short occurs between the electrodes and little deformation appears on a waveform of a signal applied to the pixel area in the same manner as the liquid crystal display element of Embodiment 1. In addition, the substrate surface achieves high evenness so as to evenly align ferroelectric liquid crystal; consequently, it is possible to realize a high-contrast display. Further, upon examining the effect of external pressure on the alignment, it is found that uneven alignment appears at a pressure of 24 kg/cm$^2$, as shown in Table 1.

Additionally, in addition to the liquid crystal display element described above, a liquid crystal display element, in which a protecting film is formed by using SiN instead of SiO$_2$ in the process of FIG. 7(c), can also improve the quality. Namely, no short appears between the electrodes and little deformation occurs on a signal waveform. Moreover, the substrate surface has high evenness, so that even alignment is realized in ferroelectric liquid crystal; consequently, it is possible to provide a high contrast display. Further, as for uneven alignment caused by external pressure, the same effect can be obtained as in the case of SiO$_2$.

The above method for manufacturing the electrode substrates forms an acrylic resin into a film by using a roll coater; thus, it is possible to form the resin layer 41 in a short time. Additionally, heating operations, that partially remove the resin layer 41, including prebaking and post-baking require a shorter time as compared with forming an SiO$_2$ film by using the LPD method. Moreover, in order to form the conductive wires 22 and the even photosensitive resin layer 41(insulating layer), the electrode substrates are manufactured by adopting the photolithography and etching methods, which are generally used for manufacturing the electrode substrates; therefore, the process of manufacturing the electrode substrates does not become complicated.

Here, the present embodiment adopts an acrylic resin as a material for the resin layer 41; however, the material is not limited to an acrylic resin as long as it is a resin material which can be removed by oxygen plasma etching or oxygen ion etching.

Embodiment 3

Referring to FIGS. 1(a) through 1(e), 4(a) and 4(b), 10, and 11, the following explanation describes a third embodiment of the present invention. Here, for convenience of explanation, those members that have the same functions and that are described in Embodiment 1 are indicated by the same reference numerals and the description thereof is omitted.

A liquid crystal display element of the present embodiment is manufactured in the same process as that of Embodiment 1(FIGS. 1(a) through 1(d)) until an acrylic positive photosensitive resin is patterned and is post-baked.

Figure 10:
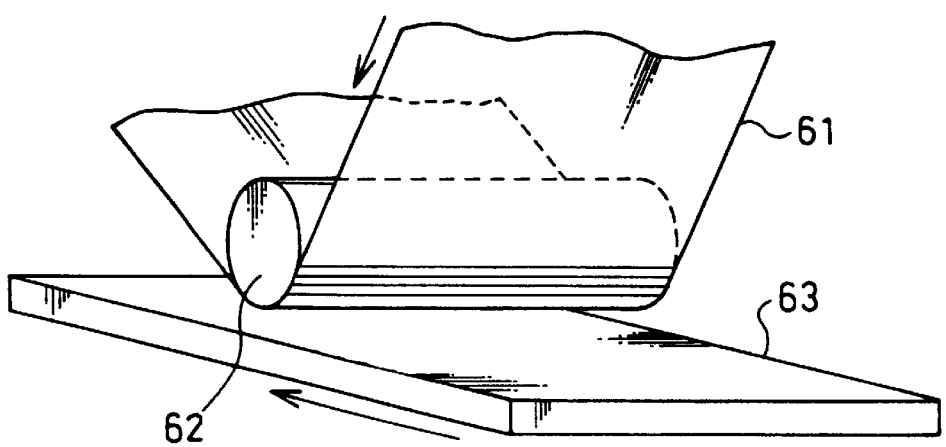
FIG. 10 is a perspective view showing a state in which projecting portions of the electrode substrate are abraded in Embodiment 3 of the present invention.

In the following process, a wrapping tape 61(#2000 manufactured by 3M Corp.) of FIG. 10 is disposed in a polishing device(not shown) of Sanshin Co. Ltd., a projecting portion P(see FIG. 11) of a photosensitive resin layer 24, that is located on the side ends of the conductive wire 22, is abraded five times by the wrapping tape 61. In this case, while a roller 62 presses the wrapping tape 61 onto an electrode substrate 63 which is manufactured in the same process shown in FIGS. 1(a) through 1(d), the wrapping tape 61 and the electrode substrate 63 are respectively shifted in the directions of arrows. The wrapping tape 61 is made of a resin film whose surface is coated with abrasive. Further, the abrading operation is carried out under the condition of a 20 kg abrading weight, a 900 mm/min tape shifting speed, and a 300 mm/min substrate shifting speed.

After the abrading operation, the projecting portion P is completely removed. Namely, as for the photosensitive resin layer 24, it is possible to remove almost all the portions projecting from the even surface where the conductive wire 22 are not formed.

As a result, among all the embodiments, the liquid crystal display element of the present embodiment realizes the most favorable evenness on the surface of the electrode substrate. The evenness is shown by a ratio of an effective bonding area(actually bonded area) of the upper surface of a spacer 4(shown in FIG. 4(b)), that is bonded to an electrode substrate 1 to an upper surface area of the spacer 4. As shown in FIG. 1, the present embodiment achieves the largest effective bonding area(83%) as compared with the other embodiments. Therefore, the electrode substrates 1 and 2 are firmly fixed so as to be less effected by uneven alignment caused by external pressure. Specifically, upon applying pressure to the liquid crystal display element in order to examine uneven alignment caused by external pressure, it is found that the smallest pressure causing uneven alignment is 28 kg/cm$^2$ as shown in Table 1, which is the largest among all the embodiments.

Further, the process of Embodiment 1(see FIGS. 1(e) and 4(a) and 4(b)) is adopted for a process after an ITO film is formed. When voltage is applied to scanning electrodes 9 and signal electrodes 16, the liquid crystal display element manufactured in this process causes no short between the electrodes and little deformation on a signal waveform, in the same manner as Embodiment 1. Additionally, high evenness is achieved on the substrate surface so as to realize even alignment; consequently, a high contrast display is achieved.

Moreover, as shown in FIG. 1(d), the present embodiment removes a part of a projecting portion P of a photosensitive resin layer 24 by using a photo process; thus, upon removing the projecting portion P by the following abrading operation, as shown in FIG. 10, merely a few times of abrading is enough to completely remove the projecting portion P. This arrangement makes it possible to obtain favorable evenness without the need for an abrading member which realizes high evenness.

Here, the following explanation fully describes evenness on the substrate surface.

Figure 11:
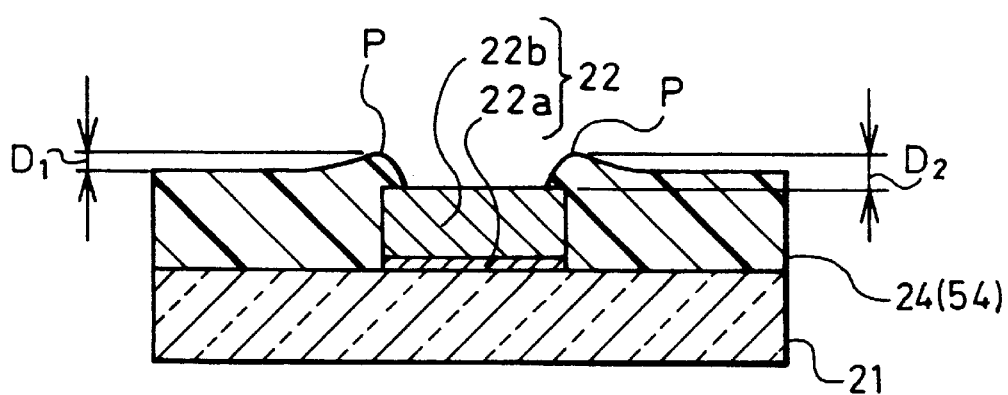
FIG. 11 is a sectional drawing showing the construction of the electrode substrate in which the photosensitive resin layer is thicker than the conductive wire.

As shown in FIG. 11, in the liquid crystal display element of the present embodiment, the photosensitive resin layer 24 has a film thickness larger than a conductive wire 22. When the above abrading operation is performed in this state, a height difference $D_1$ is 0.01 μm between the top of the projecting portion P and an even surface of the photosensitive resin layer 24, and a height difference $D_2$ is 0.06 μm between the top of the projecting portion P and the surface of the conductive wire 22.

Meanwhile, as shown in Table 1, upon examining evenness of the substrate surface regarding Embodiments 1 and 2, a height difference D1 is 0.05 μm or less and a height difference D2 is 0.1 μm or less. Therefore, it is understood that the present embodiment achieves higher evenness on the substrate surface as compared with Embodiments 1 and 2.

Embodiment 4

Referring to FIGS. 1(a) through 1(e), 3, and 12, the following explanation describes a fourth embodiment of the present invention. Here, for convenience of explanation, those members that have the same functions and that are described in Embodiment 1 are indicated by the same reference numerals and the description thereof is omitted.

Figure 12:
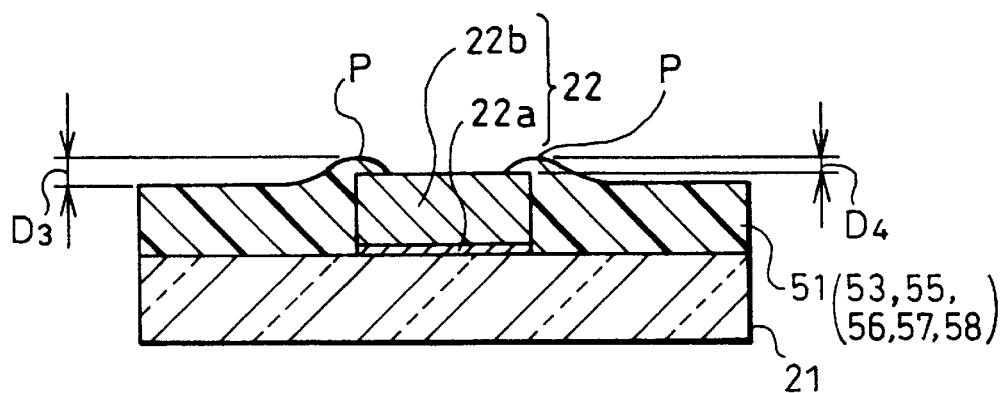
FIG. 12 is a sectional drawing showing the construction of the electrode substrate in which the photosensitive resin layer is thinner than the conductive wire.
Figure 13A:
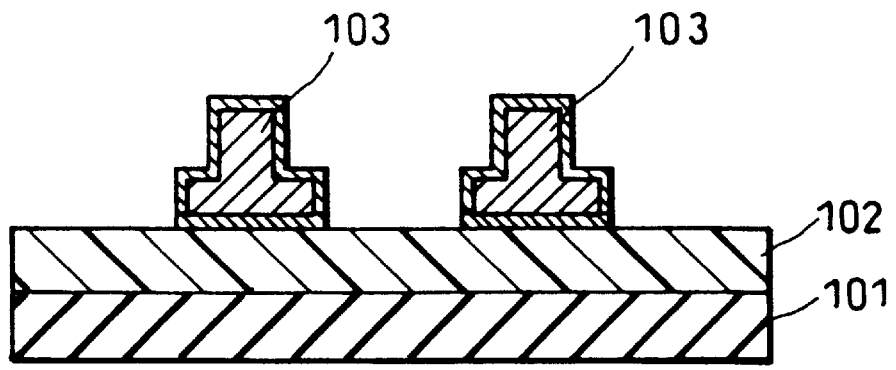
FIGS. 13(a) through 13(c) are sectional drawings showing each step of a first conventional method for forming the conductive wires on the substrate.
Figure 13B:
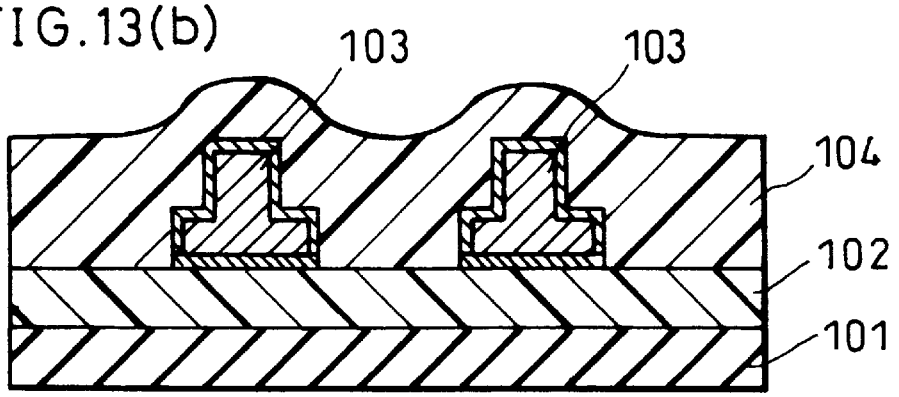
Figure 13C:
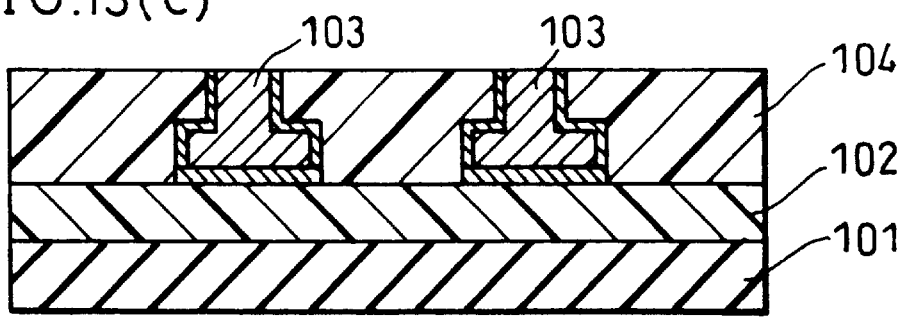
Figure 14A:
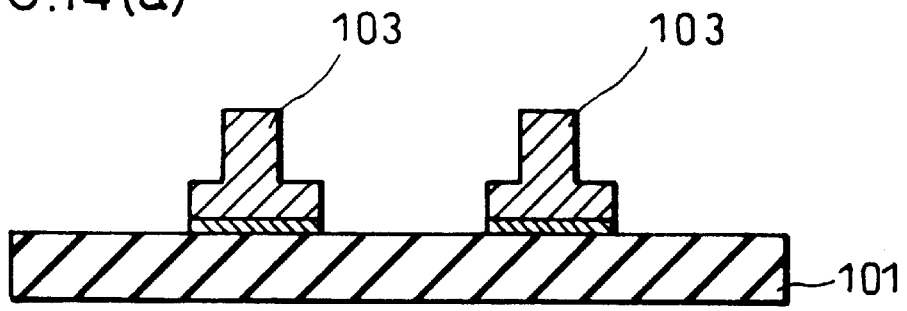
FIGS. 14(a) through 14(d) are sectional drawings showing each step of a second conventional method for forming the conductive wires on the substrate.
Figure 14B:
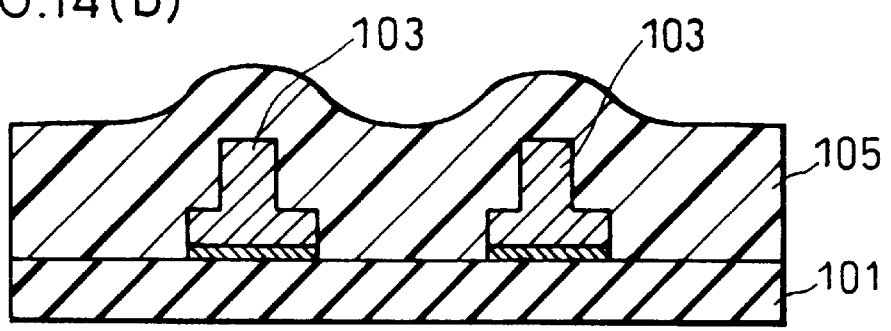
Figure 14C:
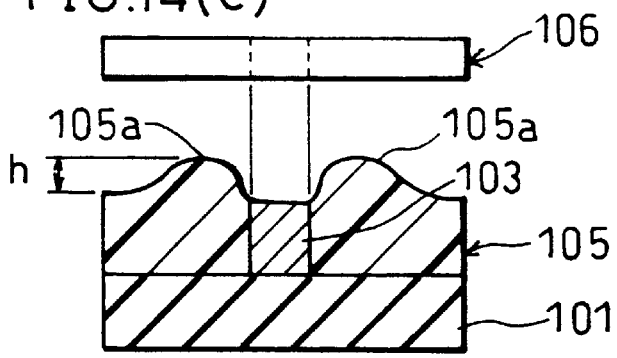
Figure 14D:
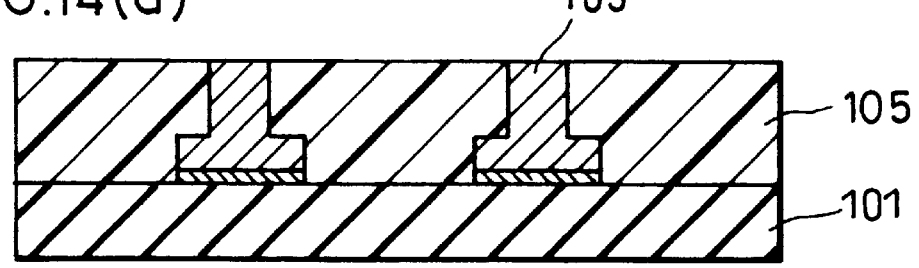
Figure 15A:
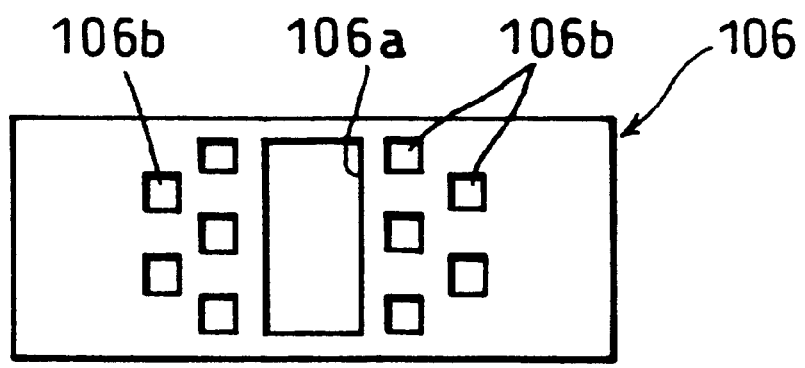
FIGS. 15(a) and 15(b) are plan and front views showing the construction of the photomask used in the process of photolithography in the second method.
Figure 15B:
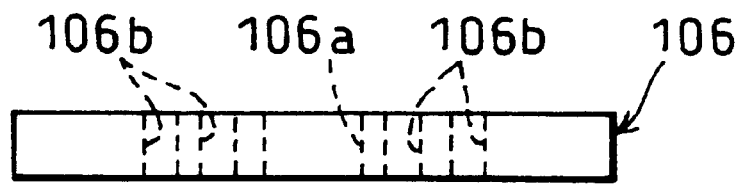
Figure 16A:
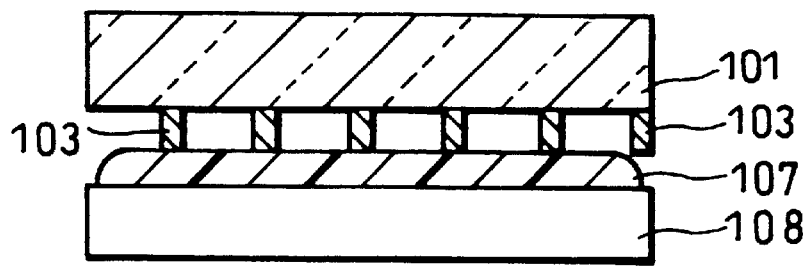
FIGS. 16(a) through 16(d) are sectional drawings showing each step of a third conventional method for forming the conductive wires on the substrate.
Figure 16B:
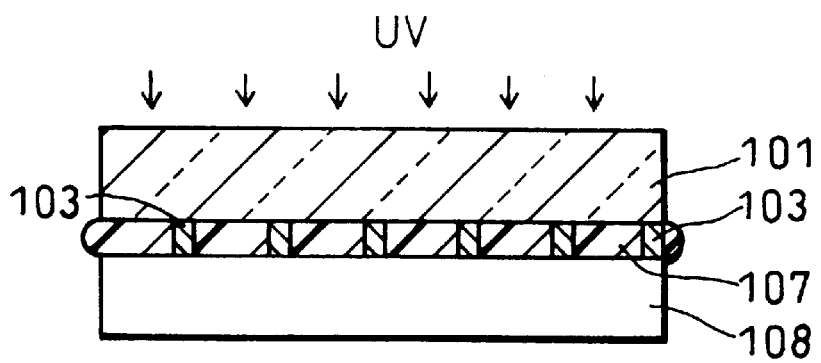
Figure 16C:
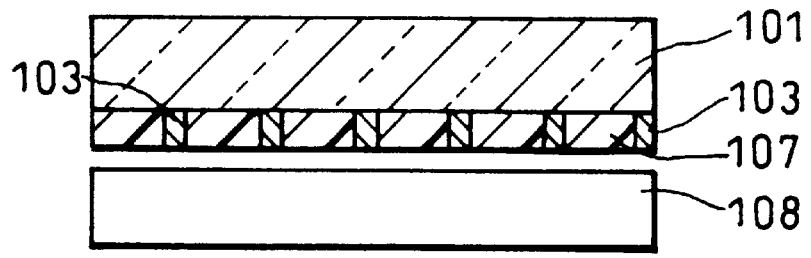
Figure 16D:
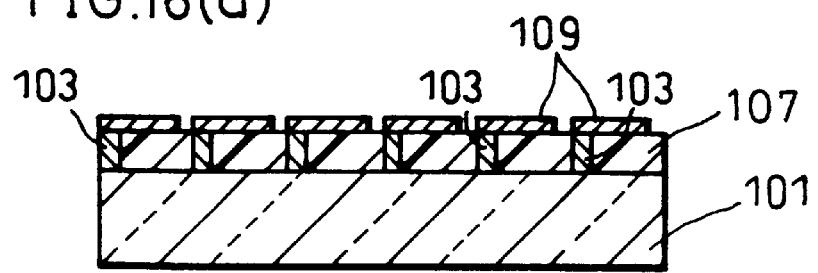
Figure 17A:
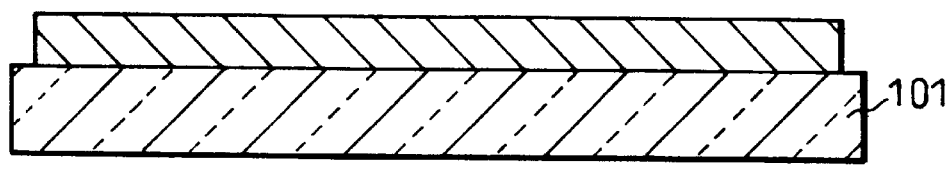
FIGS. 17(a) through 17(d) are sectional drawings showing a fourth conventional method for forming the conductive wires on the substrate.
Figure 17B:
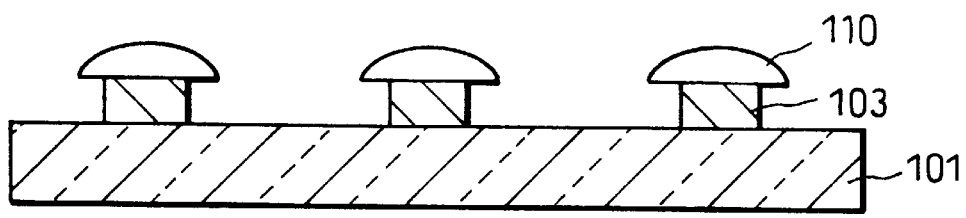
Figure 17C:
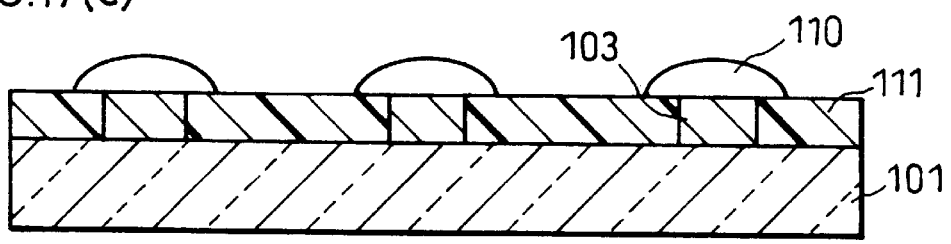
Figure 17D:
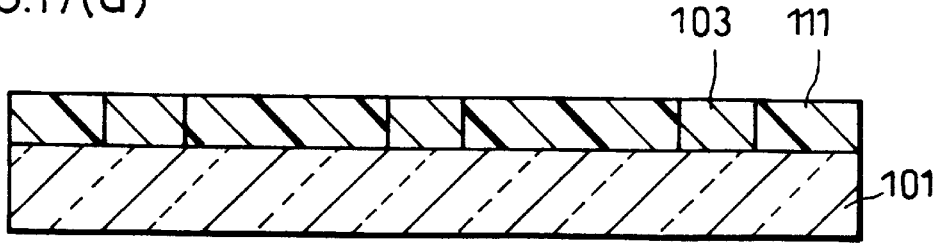

A liquid crystal display element of the present embodiment is manufactured in the process of Embodiment 1(see FIGS. 1(a) through 1(e)), except for the following steps (i) and (ii). (i) an acrylic negative photosensitive resin(JNPC series of JSR Corp.) is formed into a film having a thickness which is smaller than, 2 μm, a thickness of the conductive wire 22, by 0.05 μm, by using a spin coating; thus, as shown in FIG. 12, a photosensitive resin layer 51 is formed. (ii) as shown in FIGS. 3(a) and 3(b), a photomask 52, which turns black portions white vice versa in a photomask 25 of Embodiment 1, is used for partly removing the photosensitive resin layer 51.

In a state in which the photosensitive resin layer 51 is removed on the conductive wire 22, as shown in FIG. 12 and Table 1, a height difference $D_3$ is 0.1 μm at the maximum between (a)the top of a projecting portion P of the photosensitive resin layer 51 that projects on the conductive wire 22 and (b)an even surface of the photosensitive layer 51; and a height difference $D_4$ is 0.05 μm at the maximum between the top of the projecting portion P and the surface of the conductive wire 22.

As with Embodiment 1, the liquid crystal display element manufactured in this process causes no short between the electrodes and little deformation on a signal waveform when voltage is applied to scanning electrodes 9 and signal electrodes 16. Additionally, high evenness is achieved on the substrate surface so as to realize even alignment; consequently, a high contrast display is achieved. Further, upon examining effect on uneven alignment caused by external pressure, uneven alignment appears at 22 kg/cm² as shown in Table 1. Therefore, the liquid crystal display element of the present embodiment is provided with sufficient alignment stability against external pressure, so that no inconvenience occurs in practical use.

Embodiment 5

Referring to FIGS. 7 and 12, the following explanation describes a fifth embodiment of the present invention. Here, for convenience of explanation, those members that have the same functions and that are described in Embodiment 2 are indicated by the same reference numerals and the description thereof is omitted.

A liquid crystal display element of the present embodiment is manufactured in the process of embodiment 2(see FIGS. 7(a) through 7(e)), except for the following step. Specifically, in this step, an acrylic resin is made into a film by using a spin coater with a thickness of smaller than 2 μm, a thickness of a conductive wire 22 by 0.05 μm, on a transparent substrate 21 where the conductive wire 22 is formed; thus, a photosensitive resin layer 53 is achieved.

In a state in which the photosensitive resin layer 53 is removed on the conductive wire 22, as shown in FIG. 12 and Table 1, a height difference $D_3$ is 0.1 μm at the maximum between (a)the top of a projecting portion P of the photosensitive resin layer 53, that projects on the conductive wire 22 and (b)an even surface of the photosensitive layer 53; and a height difference $D_4$ is 0.05 μm at the maximum between the top of the projecting portion P and the surface of the conductive wire 22.

As with Embodiment 1, the liquid crystal display element manufactured in this process causes no short between the electrodes and little deformation on a signal waveform when voltage is applied to scanning electrodes 9 and signal electrodes 16. Additionally, high evenness is achieved on the substrate surface so as to realize even alignment; consequently, a high contrast display is achieved. Further, upon examining effect on uneven alignment caused by external pressure, uneven alignment appears at 21 kg/cm². Therefore, the liquid crystal display element of the present embodiment is provided with sufficient alignment stability against external pressure, so that no inconvenience occurs in practical use.

Here, upon bonding the substrates via spacers, the substrate constructions of Embodiments 1 and 2(photosensitive resin layer has a thickness larger than the conductive wire) offer virtually the same adhesion as the substrate constructions of Embodiments 4 and 5(photosensitive resin layer has a thickness smaller than the conductive wire); meanwhile, Embodiments 1 and 2 can enhance evenness more easily.

Comparative Example 1

Here, the following explanation describes a comparative example of a liquid crystal display element of Embodiment 1.

The liquid crystal display element of the present invention is manufactured in the process of Embodiment 1, except for the following step. An acrylic positive photosensitive resin is made into a film with a thickness smaller than 2 μm of the conductive wire 22 by 0.15 μm, by using a spin coater, on a transparent substrate 21 where a conductive wire 22 is formed. Thus, as shown in FIG. 11, a photosensitive resin layer 54 is formed.

As shown in FIG. 11 and Table 1, in a state in which the photosensitive resin layer 54 is removed on the conductive wire 22, a height difference $D_1$ is 0.05 μm between (a) the top of the projecting portion P of the photosensitive resin layer 54, that projects on the conductive wire 22 and (b) an even surface of the photosensitive resin layer 54; and a height difference $D_2$ is 0.20 μm between the top of the projecting portion P and the surface of the conductive wire 22.

As with Embodiment 1, the liquid crystal display element manufactured in the above process causes no electric short when voltage is applied to scanning electrodes 9 and signal electrodes 16. As shown in Table 1, regarding effect of external pressure causing uneven alignment and an effective bonding area of spacers 4, the liquid crystal display element manufactured in the above process has no problem as compared with Embodiment 1. However, uneven alignment appears from a recess that is formed due to the large height difference $D_2$ on the conductive wire 22.

Comparative Example 2

Next, the following explanation describes a comparative example of a liquid crystal display element of Embodiment 4.

The liquid crystal display element of the present comparative example is manufactured in the process of Embodiment 1, except for the following step. On a transparent substrate 21 where a conductive wire 22 is formed, an acrylic negative photosensitive resin(JNPC series manufactured by JSR Corp.) is formed into a film with a film thickness smaller than 2 µm of the conductive wire 22 by 0.15 µm, by using a spin coater. Thus, as shown in FIG. 12, a photosensitive resin layer 55 is formed.

As shown in FIG. 12 and Table 1, in a state in which the photosensitive resin layer 55 is removed on the conductive wire 22, a height difference $D_3$ is 0.20 µm between (a)the top of the projecting portion P of the photosensitive resin layer 55, that projects on the conductive wire 22 and (b)an even surface of the photosensitive resin layer 55; and a height difference $D_4$ is 0.05 µm between the top of the projecting portion P and the surface of the conductive wire 22.

The liquid crystal display element manufactured in the above process causes no electric short when voltage is applied to scanning electrodes 9 and signal electrodes 16. However, upon examining effect of external pressure on uneven alignment, it is found that uneven alignment appears at a pressure of 8 kg/cm². The pressure is less than the minimum pressure(nearly 10 kg/cm²) for using the liquid crystal display element without causing any problems in practical use (no uneven alignment). Further, when the liquid crystal display element is dismantled and the bonding state of electrode substrates 1 and 2 is observed, it is found that an effective bonding area of a spacer 4 is nearly a sixth(15%) of an upper surface of the spacer 4, as shown in Table 1, and actually bonded portions are located merely around a conductive wire 13(namely, around the conductive wire 22), which largely projects on the surface of the opposing substrate 1. As described above, the liquid crystal display element cannot be put into practical use because the alignment stability is low against external pressure.

Here, the aforementioned embodiments discuss an example in which the present invention is adopted for a liquid crystal display element. However, the present invention is not limited to a liquid crystal display element. The present invention can be also adopted for a liquid crystal element devised with an objective other than providing a display and for a similar element using a medium other than liquid crystal.

Embodiment 6

Referring to FIGS. 1(a) through 1(e) and 11, the following explanation describes a sixth embodiment of the present invention. Here, for convenience of explanation, those members that have the same functions and that are described in Embodiment 1 are indicated by the same reference numerals and the description thereof is omitted.

A liquid crystal display element of the present embodiment is manufactured in the process of embodiment 1(see FIGS. 1(a) through 1(e)), except for the following step. Specifically, in this step, an acrylic positive photosensitive resin is made into a film by using a spin coater with virtually the same thickness of a conductive wire 22, 2 µm, on a transparent substrate 21 where the conductive wire 22 is formed; thus, a photosensitive resin layer 24 is formed with a thickness larger than that of the conductive wire 22 by 0.01 µm.

Exposure conditions(mask gap and exposure amount) are adjusted as shown in Table 1 so as to partially remove the photosensitive resin layer 24 as follows: in a state in which the photosensitive resin layer 24 is removed on the conductive wire 22, as shown in FIG. 11 and Table 1, a height difference $D_1$ is 0.1 µm between (a)the top of a projecting portion P of the photosensitive resin layer 24, that projects around the side ends of the conductive wire 22 and (b)an even surface of the photosensitive layer 24; and a height difference $D_2$ is 0.11 µm between the top of the projecting portion P and the surface of the conductive wire 22.

As with Embodiment 1, the liquid crystal display element manufactured in the above process causes no short between the electrodes when voltage is applied to scanning electrodes 9 and signal electrodes 16. Further, upon examining effect on uneven alignment caused by external pressure, uneven alignment appears at 15 kg/cm². Therefore, the liquid crystal display element of the present embodiment is provided with sufficient alignment stability against external pressure, so that no inconvenience occurs in practical use. Namely, as shown in Table 1, the liquid crystal display element of the present invention is inferior to Embodiment 1 regarding the effect of external pressure on uneven alignment and an effective bonding area of a spacer 4. However, the minimum pressure where uneven alignment appears is larger than the minimum pressure (nearly 10 kg/cm²) for using the liquid crystal display element without causing any problems in practical use(no uneven alignment). Further, no unevenness is found in an initial alignment.

Embodiment 7

Referring to FIGS. 1(a) through 1(e) and 11, the following explanation describes a seventh embodiment of the present invention. Here, for convenience of explanation, those members that have the same functions and that are described in Embodiment 1 are indicated by the same reference numerals and the description thereof is omitted.

A liquid crystal display element of the present embodiment is manufactured in the process of embodiment 1(see FIGS. 1(a) through 1(e)), except for the following step. Specifically, in this step, an acrylic positive photosensitive resin is made into a film by using a spin coater with a thickness somewhat larger than that of a conductive wire 22, 2 µm, on a transparent substrate 21 where the conductive wire 22 is formed. As a result of measuring the height difference, it is found that a photosensitive resin layer 24 is formed with a thickness larger than that of conductive wire 22 by 0.02 µm.

Exposure conditions are adjusted as shown in Table 1 so as to partially remove the photosensitive resin layer 24 as follows: in a state in which the photosensitive resin layer 24 is removed on the conductive wire 22, as shown in FIG. 11 and Table 1, a height difference $D_1$ is 0.07 µm between (a)the top of a projecting portion P of the photosensitive resin layer 24, that projects around the side ends of the conductive wire 22 and (b)an even surface of the photosensitive layer 24; and a height difference $D_2$ is 0.09 µm between the top of the projecting portion P and the surface of the conductive wire 22.

As with Embodiment 1, the liquid crystal display element manufactured in this process causes no short between the electrodes when voltage is applied to scanning electrodes 9 and signal electrodes 16. Further, upon examining the effect on uneven alignment caused by external pressure, uneven alignment appears at 20 kg/cm². Therefore, the liquid crystal display element of the present embodiment is provided with sufficient alignment stability against external pressure, so that no inconvenience occurs in practical use. Namely, as shown in Table 1, the liquid crystal display element of the present embodiment is inferior to Embodiment 1 regarding the effect of external pressure on uneven alignment and an effective bonding area of a spacer 4. However, the minimum pressure where uneven alignment appears is 20 kg/cm², which is larger than the minimum pressure(nearly 10 kg/cm²) for using the liquid crystal display element without causing any problems in practical use(no uneven alignment). This value is larger than that of the liquid crystal display element of Embodiment 6. This value reflects a fact that the liquid crystal display element of the present embodiment is superior in evenness of the substrate surface to Embodiment 6.

Embodiment 8

Referring to FIGS. 1(*a*) through 1(*e*) and 11, the following explanation describes an eighth embodiment of the present invention. Here, for convenience of explanation, those members that have the same functions and that are described in Embodiment 1 are indicated by the same reference numerals and the description thereof is omitted.

A liquid crystal display element of the present embodiment is manufactured in the process of embodiment 1(see FIGS. 1(*a*) through 1(*e*)), except for the following step. Specifically, in this step, an acrylic positive photosensitive resin is made into a film by using a spin coater with virtually the same thickness of a conductive wire 22, 2 μm, on a transparent substrate 21 where the conductive wire 22 is formed; thus, a photosensitive resin layer 24 is formed with a thickness larger than that of the conductive wire 22 by 0.01 μm.

Exposure conditions are adjusted as shown in Table 1 so as to partially remove the photosensitive resin layer 24 as follows: in a state in which the photosensitive resin layer 24 is removed on the conductive wire 22, as shown in FIG. 11 and Table 1, a height difference $D_1$ is 0.04 μm between (a)the top of a projecting portion P of the photosensitive resin layer 24, that projects around the side ends of the conductive wire 22 and (b)an even surface of the photosensitive layer 24; and a height difference $D_2$ is 0.05 μm between the top of the projecting portion P and the surface of the conductive wire 22.

As with Embodiment 1, the liquid crystal display element manufactured in this process causes no short between the electrodes when voltage is applied to scanning electrodes 9 and signal electrodes 16. Further, as shown in Table 1, the liquid crystal display element of the present invention is superior to Embodiment 1 regarding the effect of external pressure on uneven alignment, and an effective bonding area of a spacer 4. Especially, the difference $D_2$ is small between the top of the projecting portion P and the surface of the conductive wire 22 so as to be superior in bonding property around the conductive wire 22. Moreover, upon measuring the effect of external pressure on uneven alignment, the minimum pressure where unevenness appears is high, 27 kg/cm².

Embodiment 9

Referring to FIGS. 1(*a*) through 1(*e*) and 12, the following explanation describes a ninth embodiment of the present invention. Here, for convenience of explanation, those members that have the same functions and that are described in Embodiment 4 are indicated by the same reference numerals and the description thereof is omitted.

A liquid crystal display element of the present embodiment is manufactured in the process of embodiment 1(see FIGS. 1(*a*) through 1(*e*)), except for the following step. Specifically, in this step, an acrylic positive photosensitive resin is made into a film by using a spin coater with virtually the same thickness of a conductive wire 22, 2 μm, on a transparent substrate 21 where the conductive wire 22 is formed; thus, a photosensitive resin layer 56 is formed with a thickness larger than that of the conductive wire 22 by 0.01 μm.

Exposure conditions are adjusted as shown in Table 1 so as to partially remove the photosensitive resin layer 56 as follows: in a state in which the photosensitive resin layer 56 is removed on the conductive wire 22, as shown in FIG. 12 and Table 1, a height difference $D_3$ is 0.11 m between (a)the top of a projecting portion P of the photosensitive resin layer 56, that projects around the side ends of the conductive wire 22 and (b)an even surface of the photosensitive layer 56; and a height difference $D_4$ is 0.1 μm between the top of the projecting portion P and the surface of the conductive wire 22.

As with Embodiment 1, the liquid crystal display element manufactured in this process causes no short between the electrodes when voltage is applied to scanning electrodes 9 and signal electrodes 16. Further, upon examining the effect on uneven alignment caused by external pressure, uneven alignment appears at 14 kg/cm². Therefore, the liquid crystal display element of the present embodiment is provided with sufficient alignment stability against external pressure, so that no inconvenience is caused in practical use. Namely, as shown in Table 1, the liquid crystal display element of the present invention is inferior to Embodiments 1 and 4 regarding the effect of external pressure on uneven alignment and an effective bonding area of a spacer 4. However, the minimum pressure where uneven alignment appears is larger than the minimum pressure(nearly 10 kg/cm²) required to use the liquid crystal display element without causing any problems in practical use(no uneven alignment). Further, no unevenness is found in an initial alignment.

Embodiment 10

Referring to FIGS. 1(*a*) through 1(*e*) and 12, the following explanation describes a tenth embodiment of the present invention. Here, for convenience of explanation, those members that have the same functions and that are described in Embodiment 4 are indicated by the same reference numerals and the description thereof is omitted.

A liquid crystal display element of the present embodiment is manufactured in the process of embodiment 1(see FIGS. 1(*a*) through 1(*e*)), except for the following step. Specifically, in this step, an acrylic positive photosensitive resin is made into a film by using a spin coater with virtually the same thickness of a conductive wire 22, 2 μm, on a transparent substrate 21 where the conductive wire 22 is formed; thus, a photosensitive resin layer 56 is formed with a thickness smaller than that of the conductive wire 22 by 0.01 μm.

Exposure conditions are adjusted as shown in Table 1 so as to partially remove the photosensitive resin layer 56 as follows: in a state in which the photosensitive resin layer 56 is removed on the conductive wire 22, as shown in FIG. 12 and Table 1, a height difference $D_3$ is 0.07 μm between (a)the top of a projecting portion P of the photosensitive resin layer 56, that projects around the side ends of the conductive wire 22 and (b)an even surface of the photosensitive layer 56; and a height difference $D_4$ is 0.06 μm between the top of the projecting portion P and the surface of the conductive wire 22.

As with Embodiment 1, the liquid crystal display element manufactured in the above process causes no short between the electrodes when voltage is applied to scanning electrodes 9 and signal electrodes 16. Moreover, as shown in Table 1, the liquid crystal display element is superior to Embodiment 4 regarding the effect of external pressure on uneven alignment, and an effective bonding area of a spacer 4. The minimum pressure where uneven alignment appears is 23 kg/cm$^2$, which is considerably larger than the minimum pressure(nearly 10 kg/cm$^2$) required to use the liquid crystal display element without causing any problems in practical use (no uneven alignment). This value is larger than that of the liquid crystal display element of Embodiment 4. This value reflects a fact that the liquid crystal display element of the present embodiment is superior to Embodiment 4 in evenness of the substrate surface.

Embodiment 11

Referring to FIGS. 1(a) through 1(e) and 12, the following explanation describes an eleventh embodiment of the present invention. Here, for convenience of explanation, those members that have the same functions and that are described in Embodiment 4 are indicated by the same reference numerals and the description thereof is omitted.

A liquid crystal display element of the present embodiment is manufactured in the process of Embodiment 1(see FIGS. 1(a) through 1(e)), except for the following step. Specifically, in this step, an acrylic positive photosensitive resin is made into a film by using a spin coater with a thickness somewhat smaller than that of a conductive wire 22, 2 μm, on a transparent substrate 21 where the conductive wire 22 is formed. As shown in FIG. 12, as a result of measuring the height difference, it is found that a photosensitive resin layer 56 is formed with a thickness smaller than that of conductive wire 22 by 0.02 μm.

Exposure conditions are adjusted as shown in Table 1 so as to partially remove the photosensitive resin layer 56 as follows: in a state in which the photosensitive resin layer 56 is removed on the conductive wire 22, as shown in FIG. 12 and Table 1, a height difference $D_3$ is 0.05 μm between (a)the top of a projecting portion P of the photosensitive resin layer 51, that projects around the side ends of the conductive wire 22 and (b)an even surface of the photosensitive layer 56; and a height difference $D_4$ is 0.03 μm between the top of the projecting portion P and the surface of the conductive wire 22.

As with Embodiment 1, the liquid crystal display element manufactured in this process causes no short between the electrodes when voltage is applied to scanning electrodes 9 and signal electrodes 16. Moreover, as shown in Table 1, the liquid crystal display element is superior to Embodiment 4 regarding the effect of external pressure on uneven alignment and an effective bonding area of a spacer 4. The minimum pressure where uneven alignment appears is 26 kg/cm$^2$, which is considerably larger than the minimum pressure(nearly 10 kg/cm$^2$) required to use the liquid crystal display element without causing any problems in practical use (no uneven alignment). This value is larger than that of the liquid crystal display element of Embodiment 4. This value reflects a fact that the liquid crystal display element of the present embodiment is superior to Embodiment 4 in evenness of the substrate surface.

Comparative Example 3

Here, the following explanation describes another comparative example of a liquid crystal display element of Embodiment 1.

The liquid crystal display element of the present comparative example is manufactured in the process of Embodiment 1, except for the following step. An acrylic positive photosensitive resin is made into a film with a thickness somewhat larger than 2 μm of the conductive wire 22, by using a spin coater, on a transparent substrate 21 where a conductive wire 22 is formed. As shown in FIG. 11, as a result of measuring the height difference, it is found that a photosensitive resin layer 54 is formed with a film thickness larger than that of the conductive wire 22 by 0.02 μm.

Exposure conditions are adjusted as shown in Table 1 so as to partially remove the photosensitive resin layer 54 as follows: in a state in which the photosensitive resin layer 54 is removed on the conductive wire 22, as shown in FIG. 11 and Table 1, a height difference $D_1$ is 0.15 μm between (a)the top of the projecting portion P of the photosensitive resin layer 54, that projects around the side ends of the conductive wire 22 and (b)an even surface of the photosensitive resin layer 54; and a height difference $D_2$ is 0.17 μm between the top of the projecting portion P and the surface of the conductive wire 22.

As with Embodiment 1, the liquid crystal display element manufactured in the above process causes no electric short when voltage is applied to scanning electrodes 9 and signal electrodes 16. However, as shown in Table 1, upon examining the effect of external pressure on uneven alignment, it is found that uneven alignment appears at a pressure of 7 kg/cm$^2$. The pressure is smaller than the minimum pressure (nearly 10 kg/cm$^2$) required to use the liquid crystal display element without causing any problems in practical use(no uneven alignment). Further, as shown in Table 1, it is found that an effective bonding area of a spacer 4 is nearly a sixth(15%) of an upper surface of the spacer 4, and actually bonded portions are located merely on largely projecting portions(projecting portion) around conductive wires 13(namely, around the conductive wires 22), and on portions which are away from the projecting portions, on the surface of the opposing substrate 1. As described above, the liquid crystal display element of the present comparative example cannot be put into practical use because the alignment stability is low against external pressure.

Comparative Example 4

Here, the following explanation describes another comparative example of a liquid crystal display element of Embodiment 1.

The liquid crystal display element of the present comparative example is manufactured in the process of Embodiment 1, except for the following step. An acrylic positive photosensitive resin is made into a film with a thickness larger than 2 μm of the conductive wire 22 by 0.05 μm, by using a spin coater, on a transparent substrate 21 where conductive wires 22 are formed. Thus, as shown in FIG. 11, a photosensitive resin layer 54 is formed.

Exposure conditions are adjusted as shown in Table 1 so as to partially remove the photosensitive resin layer 54 as follows: as shown in FIG. 11 and Table 1, in a state in which the photosensitive resin layer 54 is removed on the conductive wire 22, a height difference $D_1$ is 0.1 μm between (a)the top of a projecting portion P of the photosensitive resin layer 54, that projects around the side ends of the conductive wire 22 and (b)an even surface of the photosensitive resin layer 54; and a height difference $D_2$ is 0.15 μm between the top of the projecting portion P and the surface of the conductive wire 22.

As with Embodiment 1, the liquid crystal display element manufactured in the above process causes no electric short when voltage is applied to scanning electrodes 9 and signal electrodes 16. However, as shown in Table 1, upon measuring effect of external pressure on uneven alignment, it is found that uneven alignment appears at a pressure of 10 kg/cm². As for the liquid crystal display element of the present comparative example, an effective bonding area of a spacer 4 is, as shown in Table 1, 60% of the upper end area of the spacer 4. However, the liquid crystal display element of the present comparative example, which causes uneven alignment at a pressure of 10 kg/cm², is not favorable in practical use. Because the minimum pressure required to use the liquid crystal display element without causing any problems in practical use(no uneven alignment) is nearly 10 kg/cm². Moreover, as with Comparative Example 1, the liquid crystal display element of the present comparative example causes uneven alignment from a recess, which is formed due to the large height difference $D_2$ on the conductive wire 22.

Comparative Example 5

Here, the following explanation describes another comparative example of a liquid crystal display element of Embodiment 1.

The liquid crystal display element of the present comparative example is manufactured in the process of Embodiment 1, except for the following step. An acrylic positive photosensitive resin is made into a film with virtually the same thickness as 2 μm of the conductive wire 22, by using a spin coater, on a transparent substrate 21 where conductive wires 22 are formed. As shown in FIG. 11, consequently, a photosensitive resin layer 54 is formed with a film thickness larger than that of the conductive wire 22 by 0.01 μm.

Exposure conditions are adjusted as shown in Table 1 so as to partially remove the photosensitive resin layer 54 as follows: in a state in which the photosensitive resin layer 54 is removed on the conductive wire 22, as shown in FIG. 11 and Table 1, a height difference $D_1$ is 0.11 μm between (a)the top of a projecting portion P of the photosensitive resin layer 54, that projects around the side ends of the conductive wire 22 and (b)an even surface of the photosensitive resin layer 54; and a height difference $D_2$ is 0.12 μm between the top of the projecting portion P and the surface of the conductive wire 22.

As with Embodiment 1, the liquid crystal display element manufactured in the above process causes no electric short when voltage is applied to scanning electrodes 9 and signal electrodes 16. However, as shown in Table 1, upon examining the effect of external pressure on uneven alignment, it is found that uneven alignment appears at a pressure of 12 kg/cm². The pressure is larger than the minimum pressure (nearly 10 kg/cm²) required to use the liquid crystal display element without causing any problems in practical use(no uneven alignment). Further, as shown in Table 1, it is found that an effective bonding area of a spacer 4 is nearly 63% of an upper surface of the spacer 4, and actually bonded portions are located merely around largely projecting portions(projecting portion) of conductive wires 13 (namely, around the conductive wires 22), and on portions which are apart from the projecting portions, on the surface of the opposing substrate 1. However, unevenness partly appears in an initial alignment mainly on portions which are not bonded. However, uneven initial alignment partially appears mainly on portions which are not bonded. As described above, the liquid crystal display element of the present comparative example cannot be put into practical use because the alignment stability is low against external pressure.

Comparative Example 6

Here, the following explanation describes a comparative example of a liquid crystal display element of Embodiment 3.

The liquid crystal display element of the present comparative example is manufactured in the process of Embodiment 3, except for the following step. An acrylic positive photosensitive resin is made into a film with a film thickness smaller than 2 μm of the conductive wire 22 by 0.14 μm, by using a spin coater, on a transparent substrate 21 where a conductive wire 22 is formed. As shown in FIG. 12, consequently, a photosensitive resin layer 57 is formed.

Exposure conditions are adjusted as shown in Table 1 so as to partially remove the photosensitive resin layer 57 as follows: in a state in which the photosensitive resin layer 57 is removed on the conductive wire 22, as shown in FIG. 12 and Table 1, a height difference $D_3$ is 0.15 μm between (a)the top of a projecting portion P of the photosensitive resin layer 57, that projects around the side ends of the conductive wire 22 and (b)an even surface of the photosensitive resin layer 57; and a height difference $D_4$ is 0.01 μm between the top of the projecting portion P and the surface of the conductive wire 22.

As with Embodiment 3, the liquid crystal display element manufactured in the above process causes no electric short when voltage is applied to scanning electrodes 9 and signal electrodes 16. However, as shown in Table 1, upon examining the effect of external pressure on uneven alignment, it is found that uneven alignment appears at a pressure of 9 kg/cm². The pressure is smaller than the minimum pressure (nearly 10 kg/cm²) required to use the liquid crystal display element without causing any problems in practical use(no uneven alignment). Further, as shown in Table 1, it is found that an effective bonding area of a spacer 4 is nearly 20% of an upper end surface of the spacer 4, and actually bonded portions are located merely on largely projecting portions (projecting portion) around conductive wires 13(namely, around the conductive wires 22) on the surface of the opposing substrate 1. As described above, the liquid crystal display element of the present comparative example cannot be put into practical use because the alignment stability is low against external pressure.

Comparative Example 7

Here, the following explanation describes still another comparative example of a liquid crystal display element of Embodiment 4.

The liquid crystal display element of the present comparative example is manufactured in the process of Embodiment 1, except for the following step. An acrylic positive photosensitive resin is made into a film with virtually the same film thickness as 2 μm of the conductive wire 22, by using a spin coater, on a transparent substrate 21 where a conductive wires 22 are formed. As shown in FIG. 12, consequently, a photosensitive resin layer 58 is formed with a film thickness smaller than that of the conductive wire 22 by 0.01 μm.

Exposure conditions are adjusted as shown in Table 1 so as to partially remove the photosensitive resin layer 58 as follows: in a state in which the photosensitive resin layer 58 is removed on the conductive wire 22, as shown in FIG. 12 and Table 1, a height difference $D_3$ is 0.13 μm between (a)the top of a projecting portion P of the photosensitive resin layer 58, that projects around the side ends of the conductive wire 22 and (b)an even surface of the photosensitive resin layer 58; and a height difference $D_4$ is 0.12 μm between the top of the projecting portion P and the surface of the conductive wire 22.

As with Embodiment 4, the liquid crystal display element manufactured in the above process causes no electric short when voltage is applied to scanning electrodes 9 and signal electrodes 16. However, as shown in Table 1, upon examining the effect of external pressure on uneven alignment, it is found that uneven alignment appears at a pressure of 9 kg/cm². The pressure is smaller than the minimum pressure (nearly 10 kg/cm²) required to use the liquid crystal display element without causing any problems in practical use(no uneven alignment). Further, as shown in Table 1, an effective bonding area of a spacer 4 is nearly 20% of an upper end surface of the spacer 4, and actually bonded portions are located merely on largely projecting portions(projecting portion) around conductive wires 13(namely, around the conductive wires 22) and on portions which are apart from the projecting portions, on the surface of the opposing substrate 1. As described above, the liquid crystal display element of the present comparative example cannot be put into practical use because the alignment stability is low against external pressure.

TABLE 1

| | LOWEST PRESSURE CAUSING UNEVEN ALIGNMENT (kg/cm²) | RATIO OF EFFECTIVE BONDING AREA TO UPPER END SURFACE OF SPACER (%) | UNEVEN INITIAL ALIGNMENT | HEIGHT DIFFERENCE BETWEEN PORTIONS | |
|---|---|---|---|---|---|
| | | | | $D_1$ or $D_3$ | $D_2$ or $D_4$ |
| EMBODIMENT 1 | 25 | 75 | No | 0.05 ≧ | 0.1 ≧ |
| EMBODIMENT 2 | 24 | 75 | No | 0.05 ≧ | 0.1 ≧ |
| EMBODIMENT 3 | 28 | 83 | No | 0.01 | 0.06 |
| EMBODIMENT 4 | 22 | 70 | No | 0.1 ≧ | 0.05 ≧ |
| EMBODIMENT 5 | 21 | 70 | No | 0.1 ≧ | 0.05 ≧ |
| EMBODIMENT 6 | 15 | 68 | No | 0.1 | 0.11 |
| EMBODIMENT 7 | 20 | 72 | No | 0.07 | 0.09 |
| EMBODIMENT 8 | 27 | 80 | No | 0.05 | 0.04 |
| EMBODIMENT 9 | 14 | 65 | No | 0.11 | 0.1 |
| EMBODIMENT 10 | 23 | 72 | No | 0.07 | 0.06 |
| EMBODIMENT 11 | 26 | 80 | No | 0.05 | 0.03 |
| COM. EXAMPLE 1 | 24 | 75 | Yes | 0.05 | 0.20 |
| COM. EXAMPLE 2 | 8 | 15 | Yes | 0.20 | 0.05 |
| COM. EXAMPLE 3 | 7 | 15 | Yes | 0.15 | 0.17 |
| COM. EXAMPLE 4 | 10 | 60 | Yes | 0.1 | 0.15 |
| COM. EXAMPLE 5 | 12 | 63 | Yes | 0.11 | 0.12 |
| COM. EXAMPLE 6 | 9 | 20 | Yes | 0.15 | 0.01 |
| COM. EXAMPLE 7 | 9 | 20 | Yes | 0.13 | 0.12 |

As described above, in Embodiments 1 through 11 and Comparative Examples 1 through 7, in the case when a height difference(height difference $D_1$ or $D_3$) is 0.11 μm or less between (a) a projecting portion P that is formed around the side ends of a conductive wire 22 and (b) the virtually even surface of a resin film(photosensitive resin layer), where the conductive wire is not formed between conductive wires 22, and when a height difference (height difference $D_2$ or $D_4$) is 0.11 μm or less between the projecting portion P and the surface of the conductive wire 22, superior evenness can be achieved, no short appears between the electrodes, and little deformation appears on a waveform of a signal applied to a pixel area. Additionally, the surface of the substrate is superior in evenness, so that ferroelectric liquid crystal is evenly aligned; consequently, a high-contrast display can be achieved. Further, without uneven initial alignment, the minimum pressure where uneven alignment occurs is larger than 10 kg/cm², which is the minimum available pressure.

Meanwhile, as described in Comparative Examples 1 through 7, in the case when a height difference exceeds 0.11 μm between (a) the projecting portion P that is formed around the side ends of a conductive wire 22 and (b) the virtually even surface of the resin film, where the conductive wires are not formed between conductive wires 22, or when a height difference exceeds 0.11 μm between the projecting portion P and the surface of the conductive wire 22, unevenness partially appears on the initial alignment, or the minimum pressure where uneven alignment appears becomes lower than 10 kg/cm².

Also, as described in Comparative Examples 2, 3, 6, and 7, in view of the relationship between (a)the minimum pressure where uneven alignment appears and (b)the ratio of an effective bonding area to the upper end surface of a spacer, it is understood that when the ratio of the effective bonding area is smaller than 60%, the pressure becomes smaller than 10 kg/cm², the minimum available pressure of the liquid crystal display element. Upon devising a panel (liquid crystal display element) which can be put into practical use in view of the minimum pressure where uneven alignment appears and the ratio of the effective bonding area, as for liquid crystal display element using the electrode substrate, the minimum pressure where uneven alignment appears needs to be set at 10 kg/cm² or more, preferably at approximately 15 kg/cm² or more, more preferably at 20 kg/cm² or more, and furthermore preferably at 25 kg/cm² or more.

Moreover, as shown in Table 1, in view of the relationship between the minimum pressure where uneven alignment appears and the ratio of the effective bonding area, it is understood that the ratio of the effective bonding area is preferably set at 65% or more, more preferably at 70% or more, furthermore preferably at 80% or more.

As described above, the electrode substrate of the present invention, which has a plurality of conductive wires formed on the substrate, a resin film formed between the conductive wires, an electrode film which is formed on the conductive wires and is conductively contact with the conductive wires, has a construction in which a height difference represented by height difference $D_1$ or $D_3$ is 0.11 μm or less between (a) a projecting portion P that is made of the resin film around the ends of a conductive wire and (b) the virtually even surface of a resin film, where the conductive wire are not formed between conductive wires; and a height difference represented by height difference $D_2$ or $D_4$ is 0.11 μm or less between the projecting portion P and the surface of the conductive wire.

In the above-mentioned arrangement, it is desirable that no projecting portion appear around the ends of the conductive wire. However, when a height difference is preferably set at 0.11 μm or less, more preferably at 0.1 μm or less, furthermore preferably at 0.05 μm or less between the virtually even surface of the resin film and the projecting portion, it is possible to achieve sufficient evenness on the resin film. Also, when a height difference is preferably set at 0.11 μm or less, more preferably at 0.1 μm or less, furthermore preferably at 0.05 μm or less between the projecting portion and the surface of the conductive wire, it is possible to achieve sufficient evenness between the resin film and the conductive wire. Therefore, when the electrode substrate of the present invention is, for example, adopted for the liquid crystal display element, it is possible to achieve high evenness on each of the films formed on the electrode film; thus, the alignment and a switching property of liquid crystal can be maintained in a favorable manner. Namely, even in the event of a projecting portion around the ends of the conductive wires on the resin film, as described above, a height difference is regulated at 0.11 μm or less between the projecting portion and the virtually even surface of the resin film, where the conductive wires are not formed, and a height difference is regulated at 0.11 μm or less between the projecting portion and the surface of the conductive wire; therefore, it is possible to manufacture the liquid crystal display element in which high evenness is obtained, no unevenness appears on the initial alignment, and the minimum pressure where uneven alignment appears is more than 10 kg/cm² required for practical use.

In this case, either the height difference $D_1$ or $D_3$ or the height difference $D_2$ or $D_4$ are measured in accordance with a thickness of the resin film relative to a thickness of the conductive wire so as to evaluate the obtained liquid crystal display element. Namely, depending upon whether a thickness of the resin film is larger or smaller than that of the conductive wire, it is possible to measure the larger one of the height difference $D_1$ or $D_3$ and the height difference $D_2$ or $D_4$. For example, when a thickness of the resin film is larger than that of the conductive wire, the height difference $D_2$ is measured, and when a thickness of the resin film is smaller than that of the conductive wire, the height difference $D_3$ is measured. In other words, it is merely necessary to set the larger one of the height difference $D_1$ or $D_3$ and the height difference $D_2$ or $D_4$ at 0.11 μm or less. Here, upon manufacturing the electrode substrate, the manufacturing conditions are arranged so as to satisfy this requirement; thus, it is possible to achieve the liquid crystal display element which has the above-mentioned excellent performance. When the obtained electrode substrate does not satisfy the requirement, for example, an abrading operation is performed so as to satisfy the requirement; hence, it is possible to achieve the liquid crystal display element which satisfies the requirement and has the above-mentioned excellent performance.

One example of the electrode substrate in accordance with the present invention, in which conductive wires are formed into a predetermined shape on the substrate, a resin film is formed between the conductive wires, an electrode film is formed on the conductive wires and is conductively contact with the conductive wires, has a construction in which a thickness of the resin film, where the conductive wires are not formed, is larger than that of the conductive wire; a height difference value is 0.05 μm or less between the virtually even surface of the resin film and a projecting portion; and a height difference value is 0.1 μm or less between the projecting portion and the surface of the conductive wire.

Another example of the electrode substrate in accordance with the present invention, in which conductive wires are formed into a predetermined shape on the substrate, a resin film is formed between the conductive wires, an electrode film is formed on the conductive wires and is conductively contact with the conductive wires, has a construction in which a thickness of the resin film, where the conductive wires are not formed, is smaller than that of the conductive wire; a height difference value is 0.1 μm or less between the virtually even surface of the resin film and a portion of the resin film that projects around the side ends of the conductive wire; and a height difference value is 0.05 μm or less between the projecting portion and the surface of the conductive wire.

Further, as for the electrode substrate of the present invention, the conductive wire preferably includes a ground film, which is made of conductive materials having adhesion against the substrate, and a low resistance film.

The ground film is made of conductive materials having adhesion against the substrate, for example, materials selected from Ta, Cr, Ni, Mo, and ITO, so as to prevent the conductive wire from being exfoliated. Moreover, for the low resistance film, it is possible to adopt materials selected from Cu, Al, Au, and Ag. Especially, Cu and Al are desirable, and Cu is further desirable for the low resistance film in view of the resistance value, the processing, and the cost.

Moreover, in the electrode substrate of the present invention, the conductive wire preferably includes the low resistance film and an antioxidant film, which is made of conductive materials having resistance to corrosion on the low resistance film.

Such an antioxidant film makes it possible to prevent corrosion of the low resistance film, that is caused by operations performed after the low resistance film has been formed. As the antioxidant film, corrosion-resistant metals such as Ta, Cr, Ni, and Mo are adopted. Moreover, as the low resistance film, it is possible to adopt materials selected from Cu, Al, Au, and Ag. Especially, Cu and Al are desirable, and Cu is further desirable for the low resistance film in view of the resistance value, the processing, and the cost.

As described above, the manufacturing method of the electrode substrate of the present invention includes the following steps:

(1) a first step for forming a plurality of conductive wires on the substrate, (2) a second step for forming a resin film, which covers the conductive wires and portions between the conductive wires, on the substrate where the conductive wires are formed, (3) a third step for removing portions of the resin film that cover the conductive wires so as to expose at least a part of the surface of the conductive wires, (4) a fourth step for partially removing projecting portions which appear on the resin layer around the ends of the conductive wires due to the exposure of the conductive wires, so as to set a height difference at 0.11 $\mu$m or less between the projecting portion and the virtually even surface of the resin film where the conductive wires are not formed, and to set a height difference at 0.11 $\mu$m or less between the projecting portion and the surface of the conductive wire, and (5) a fifth step for forming an electrode film which is formed on the resin film and the conductive wires so as to be conductively contact with the conductive wires.

With the above-mentioned method, upon partially exposing the surface of the conductive wires in the third step, the projecting portions, which appear on the resin layer around the ends of the conductive wires due to the exposure of the conductive wires so as to set a height difference at 0.11 $\mu$m or less between the projecting portion and the virtually even surface of the resin film where the conductive wires are not formed, and to set a height difference at 0.11 $\mu$m or less between the projecting portion and the surface of the conductive wire; thus, high evenness can be achieved on the surface of the resin film, and between the surface of the resin film and the surface of the conductive film. Hence, in the fifth step, it is possible to form the electrode film in a virtually even manner on the resin film and the conductive wires.

Therefore, when the electrode substrate manufactured in the above steps is adopted for the liquid crystal display element, it is possible to evenly form the films provided afterwards on the electrode film. Hence, the alignment and the switching property of the liquid crystal can be maintained in a favorable manner.

Namely, even in the event of the projecting portions of the resin film around the ends of the conductive wires, as described above, a height difference is set at 0.11 $\mu$m or less between the projecting portion and the virtually even surface of the resin film where the conductive wires are not formed, and a height difference is set at 0.11 $\mu$m or less between the projecting portion and the surface of the conductive wire, so that it is possible to manufacture the liquid crystal display element in which evenness is high, no unevenness appears in the initial alignment, and the minimum pressure where uneven alignment appears is more than 10 kg/cm$^2$ required for practical use.

Therefore, without a conventional manufacturing method for completely removing the projecting portions of the resin film, the manufacturing method of the electrode substrate of the present invention makes it possible to readily manufacture the liquid crystal display element which is superior in evenness, at low cost in a practical manner.

Furthermore, the above method is more practical and easy because this method forms the resin layer with a thickness smaller or larger than that of the conductive wire, at portions where the conductive wires are not formed.

When the above method partially removes the projecting portions in the fourth step, it is desirable to remove the projecting portions so as to set a height difference at 0.1 $\mu$m or less between the projecting portion and the virtually even surface of the resin film. Further, it is more desirable to remove the projecting portions so as to set the height difference at 0.05 $\mu$m or less. Moreover, as for a height difference between the projecting portion and the surface of the conductive wire, it is desirable to remove the projecting portions so as to set a height difference at 0.1 $\mu$m or less. Further, it is more desirable to remove the projecting portion so as to set the height difference at 0.05 $\mu$m or less. This arrangement makes it possible to achieve higher evenness on the resin film.

In the second step, when the resin film is formed so as to have a smaller thickness than the conductive wire, in the fourth step, it is particularly desirable to remove the projecting portions so as to set a height difference at 0.05 $\mu$m or less between the projecting portion formed on the resin film around side ends of the conductive wire, and the virtually even surface of the resin film where the conductive wires are not formed. In the second step, when the resin film is formed so as to have a smaller thickness than the conductive wire, in the fourth step, it is particularly desirable to remove the projecting portions so as to set a height difference at 0.05 $\mu$m or less between the projecting portion and the surface of the conductive wire.

Specifically, a method, which manufactures the above-mentioned electrode substrate described as one example of the present invention, includes the following steps:

(1) a first step for forming conductive wires into a predetermined shape on the substrate, (2) a second step for forming a resin film, whose thickness is larger than that of the conductive wire, on the substrate including the conductive wires, (3) a third step for removing portions of the resin film that cover the conductive wires, so as to expose at least a part of the surface of the conductive wires, (4) a fourth step for partially removing projecting portions which appear on the resin layer around the side ends of the conductive wires, so as to set a height difference at 0.05 $\mu$m or less between the projecting portion and the virtually even surface of the resin film, and to set a height difference at 0.1 $\mu$m or less between the projecting portion and the surface of the conductive wire, and (5) a fifth step for forming an electrode film, which is conductively contact with the conductive wires, on the resin film and the conductive wires.

Further, specifically, a method, which manufactures the above-mentioned electrode substrate described as another example of the present invention, includes the following steps:

(1) a first step for forming conductive wires into a predetermined shape on the substrate, (2) a second step for forming a resin film, whose thickness is smaller than that of the conductive wire, on the substrate including the conductive wires, (3) a third step for removing portions of the resin film that cover the conductive wires, so as to expose at least a part of the surface of the conductive wires, (4) a fourth step for partially removing projecting portions which appear on the resin layer around the side ends of the conductive wires, so as to set a height difference at 0.1 $\mu$m or less between the projecting portion and the virtually even surface of the resin film, and to set a height difference at 0.05 $\mu$m or less between the projecting portion and the surface of the conductive wire, and (5) a fifth step for forming an electrode film which is conductively contact with the conductive wires on the resin film and the conductive wires.

In the above manufacturing methods, in the second step, the resin film is formed so as to be thinner or thicker than the conductive wire, and the conductive wire formed in the first step is covered with the resin film. And then, in the third step, the resin film is partially removed so as to expose a part of the surface of the conductive wires. The above-mentioned method makes it possible to manufacture the exemplified electrode substrate that can favorably maintain the alignment and the switching property of the liquid crystal.

In the manufacturing method of the electrode substrate in accordance with the present invention, the third and fourth steps preferably include a photo process such as photolithography and a heating operation. Specifically, the third and fourth steps are favorably performed by the photo process including the photolithography and a heating operation. This arrangement makes it possible to dispense with a special processing device and a long process upon obtaining evenness on the resin film.

In this case, it is desirable to form the resin film by using a photosensitive resin. The resin film made of a photosensitive resin is readily processed by a photo process. Further, in order to remove the projecting portions in the fourth step, it is desirable to use an acrylic photosensitive resin which tends to change in shape upon performing a heating operation(baking of the resin film).

Also, it is desirable that the manufacturing method of the electrode substrate of the present invention further include the step for forming a protecting film, which covers the resin film other than the surfaces of the conductive wires, between the second and the third steps. Such a protecting film is provided so as to protect portions of the resin film that do not need to be removed in the third step, for example, in the case of a dry etching.

In the manufacturing method of the electrode substrate of the present invention, the third and fourth steps preferably include a dry etching process. Specifically, it is desirable to perform the third and fourth steps by using a dry etching. As for the dry etching, an oxygen plasma etching or oxygen ion etching is particularly favorable. In the case of these etching methods, due to the property of etching isotropically, the resin film is removed from a patterned portion of the protecting film to the side ends of the conductive wire. Hence, in addition to the resin film on the surfaces of the conductive wires, the resin film around the conductive wires can be readily removed.

Further, in this case, the resin film is favorably made of a non-photosensitive resin. As the non-photosensitive resin, for example, an acrylic resin is favorable. When the acrylic resin is used, the oxygen plasma etching or oxygen ion etching make it possible to readily remove the resin film.

The protecting film is preferably made of silicon oxide or silicon nitride. Silicon oxide or silicon nitride has resistance to an oxygen plasma etching and an oxygen ion etching, so that the protecting film made of silicon oxide or silicon nitride acts as a mask upon etching the resin film.

Furthermore, in the manufacturing method of the electrode substrate of the present invention, the fourth step is performed by abrading as well. Namely, it is desirable that the fourth step further include an abrading process in addition to the photo process or a dry etching. As described above, in the fourth step, a photo process or a dry etching removes the projecting portions. In this state, the projecting portions are sufficiently reduced in size. Therefore, an abrading operation is added to the fourth step, so that merely infrequent abrading operations make it possible to remove the projecting portions in a virtually complete manner.

Additionally, it is desirable that the manufacturing method of the electrode substrate of the present invention further include a step for performing a surface treatment on the conductive wires by using an acid, between the fourth and fifth steps. Upon completion of the fourth step, an oxide film is formed and a resin thin film has remained since the resin film is formed, on the conductive wires. Therefore, a surface treatment is performed on the conductive wires by using an acid so as to remove the unnecessary films. Consequently, a conductive contact can be sufficiently obtained between the conductive wires and the electrode film.

As for the manufacturing method for the electrode substrate of the present invention, the first step preferably includes the following steps: a ground film made of indium tin oxide is formed, a low resistance film made of copper is formed thereon, and the ground film is patterned by using a dry etching. In the liquid crystal display element, the ground film made of indium tin oxide has superior adhesion for both copper and the substrate which is generally made of resin and glass. Therefore, the ground film is formed before the low resistance film has been formed so as to prevent the conductive wire from being exfoliated from the substrate. Further, the ground film is etched by using a dry etching such as an argon plasma so as to dispense with an overetching using ITO and to prevent electric leakage occurring via the ITO. Therefore, it is possible to realize a low-resistance electrode at low cost and to improve the yield of the liquid crystal display element.

Additionally, in the fifth step, the manufacturing method of the electrode substrate of the present invention preferably forms the electrode film so as to entirely cover the conductive wires. With this arrangement, upon forming the other layers which cover the electrode film, for example, an insulating film and an alignment film, the electrode film protects the conductive wires. Therefore, it is possible to prevent degradation of the conductive wires.

As described above, the liquid crystal display element of the present invention, in which liquid crystal is sandwiched between a pair of the electrode substrates opposing each other, has a construction in which at least one of the electrode substrates is the electrode substrate of the present invention.

As described above, the liquid crystal display element adopts the electrode substrates realizing high evenness so as to favorably maintain the alignment and the switching property of the liquid crystal. Therefore, it is possible to achieve a property realizing a high-contrast and even display and to provide excellent performance achieved by the aforementioned electrode substrates.

Moreover, the liquid crystal display element of the present invention, in which liquid crystal is sandwiched between a pair of electrode substrates, is characterized in that at least one of the electrode substrates is the electrode substrate manufactured by the above-mentioned method.

As described above, as with the aforementioned liquid crystal display element, the above liquid crystal display element adopts electrode substrates which achieve high evenness so as to favorably maintain the alignment and the switching property of the liquid crystal. Therefore, it is possible to obtain a property achieving a high-contrast and even display and to provide excellent performance achieved by the aforementioned electrode substrates.

The liquid crystal display elements of the present invention is preferably provided with wall-shaped spacers which are formed on one of the electrode substrates and are bonded to the other electrode substrate so as to maintain a certain distance between the electrode substrates.

As described above, these liquid crystal display elements realize high evenness on the electrode substrates; thus, it is possible to obtain a sufficiently large bonding area upon bonding the spacer and the electrode substrate, and to increase the strength of the liquid crystal display element against external pressure. Therefore, it is possible to prevent uneven alignment caused by external pressure, which is applied to the liquid crystal display element in a practical use, so as to improve the display quality.

Further, the above liquid crystal display element preferably includes ferroelectric liquid crystal as liquid crystal. The ferroelectric liquid crystal makes it possible to more favorably maintain the alignment and the switching property of the liquid crystal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrode substrate comprising:
   a plurality of conductive wires formed on the substrate,
   a resin film formed on said conductive wires, and
   an electrode film formed on said conductive wires so as to be conductively contact with said conductive wires,
   wherein a height difference is 0.11 $\mu$m or less between a projecting portion formed on said resin film around ends of said conductive wires and a virtually even surface of said resin film at a portion where said conductive wire is not formed; and a height difference is 0.11 $\mu$m or less between said projecting portion and a surface of said conductive wire, while an upper surface of said projecting portion extends higher than a height of the surface of said conductive wire.

2. The electrode substrate as defined in claim 1, wherein said conductive wire includes a ground film made of a conductive material having adhesion against said substrate, and a low resistance film.

3. The electrode substrate as defined in claim 2, wherein said low resistance film is made of copper.

4. The electrode substrate as defined in claim 1, wherein said conductive wire includes a low resistance film and an antioxidant film which is made of a conductive material having resistance against corrosion on said low resistance film.

5. The electrode substrate as defined in claim 4, wherein said low resistance film is made of copper.

6. A method for manufacturing an electrode substrate comprising the steps of:
   a first step for forming a plurality of conductive wires on a substrate,
   a second step for forming a resin film so as to cover said conductive wires and a portion between said conductive wires, on said substrate where said conductive wires are formed,
   a third step for removing a part of said resin film that covers said conductive wire, so as to expose at least a part of a surface of said conductive wire,
   a fourth step for partially removing a projecting portion, which appears on said resin layer around ends of said conductive wire due to an exposure of said conductive wire, so as to set a height difference at 0.11 $\mu$m or less between said projecting portion and a virtually even surface of said resin film at a portion where said conductive wire is not formed, and to set a height difference at 0.11 $\mu$m or less between said projecting portion and the surface of said conductive wire, and
   a fifth step for forming an electrode film which is formed on said resin film and said conductive wire so as to be conductively contact with said conductive wire.

7. The method for manufacturing the electrode substrate as defined in claim 6, wherein said second step forms said resin layer with a thickness larger than that of said conductive wire.

8. The method for manufacturing the electrode substrate as defined in claim 7, wherein a projecting portion, which is formed on said resin film around ends of said conductive wire, is partially removed so as to set a height difference at 0.05 $\mu$m or less between said projecting portion and a virtually even surface of said resin film at a portion where said conductive wire is not formed.

9. The method for manufacturing the electrode substrate as defined in claim 6, wherein said second step forms said resin film with a thickness smaller than that of said conductive wire.

10. The method for manufacturing the electrode substrate as defined in claim 9, wherein said fourth step partially removes said projecting portion so as to set a height difference at 0.05 $\mu$m or less between said projecting portion and a surface of said conductive wire.

11. The method for manufacturing the electrode substrate as defined in claim 6, wherein said third and fourth steps include a photo process.

12. The method for manufacturing the electrode substrate as defined in claim 11, wherein said resin film is made of a photosensitive resin.

13. The method for manufacturing the electrode substrate as defined in claim 12, wherein said fourth step further includes an abrading process.

14. The method for manufacturing the electrode substrate as defined in claim 6, further comprising the step for forming a protecting film which covers said resin film other than a surface of said conductive wire, between said second and third steps.

15. The method for manufacturing the electrode substrate as defined in claim 14, wherein said third and fourth steps include a dry etching process.

16. The method for manufacturing the electrode substrate as defined in claim 14, wherein said resin film is made of a non-photosensitive resin.

17. The method for manufacturing the electrode substrate as defined in claim 14, wherein said protecting film is made of silicon oxide or silicon nitride.

18. The method for manufacturing the electrode substrate as defined in claim 14, wherein said fourth step further includes an abrading process.

19. The method for manufacturing the electrode substrate as defined in claim 6, further comprising the step of performing a surface treatment on said conductive wire by using an acid, between said fourth and fifth steps.

20. The method for manufacturing the electrode substrate as defined in claim 6, wherein in said first step, a ground film made of indium tin oxide is formed, a low resistance film made of copper is formed thereon, and the ground film is patterned by using a dry etching.

21. The method for manufacturing the electrode substrate as defined in claim 6, wherein in said fifth step, said electrode film is formed so as to entirely cover said conductive wire.

22. A liquid crystal display element, in which liquid crystal is sandwiched between a pair of opposing electrode substrates, wherein at least one of the electrode substrates includes a plurality of conductive wires formed on the substrate, a resin film formed between said conductive wires, an electrode film formed on said conductive wire so as to be conductively contact with said conductive wire; a height difference is 0.11 µm or less between a projecting portion formed on said resin film around ends of said conductive wire and a virtually even surface of said resin film at a portion where said conductive wire is not formed; and a height difference is 0.11 µm or less between the projecting portion and a surface of said conductive wire, while an upper surface of said projecting portion extends higher than a height of the surface of said conductive wire.

23. The liquid crystal element as defined in claim 22, further comprising a wall-shaped spacer which is formed on one of said electrode substrates and is bonded to the other substrate so as to maintain a certain distance between said electrode substrates.

24. The liquid crystal display element as defined in claim 22, wherein said liquid crystal is ferroelectric liquid crystal.

25. The liquid crystal display element as defined in claim 23, wherein said spacer has an effective bonding area, that is bonded to the other: electrode substrate, of more than 70% relative to an upper end of said spacer.

26. The liquid crystal display element as defined in claim 22, wherein said electrode substrate has a minimum pressure of 20 kg/cm$^2$, where uneven alignment appears.

27. A liquid crystal display element, in which liquid crystal is sandwiched between a pair of opposing electrode substrates, wherein at least one of the electrode substrates is formed in a manufacturing method comprising the steps of: a first step for forming a plurality of conductive wires on at least one of said electrode substrates; a second step for forming a resin film so as to cover said conductive wire and a portion between said conductive wires, on said substrate having said conductive wires formed; a third step for removing a portion of said resin film that cover said conductive wire, so as to expose at least a part of a surface of said conductive wire; a fourth step for partially removing a projecting portion, which appears on said resin layer around ends of said conductive wire due to exposure of said conductive wire, so as to set a height difference at 0.11 µm or less between said projecting portion and a virtually even surface of said resin film at a portion where said conductive wire is not formed, and to set a height difference at 0.11 µm or less between said projecting portion and a surface of said conductive wire, while an upper surface of said projecting portion extends higher than a height of the surface of said conductive wire; and a fifth step for forming an electrode film which is formed on said resin film and said conductive wire so as to be conductively contact with said conductive wire.

28. The liquid crystal display element as defined in claim 27, further comprising a wall-shaped spacer which is formed on one of said electrode substrates and is bonded to the other substrate so as to maintain a certain distance between said electrode substrates.

29. The liquid crystal display element as defined in claim 28, wherein said spacer has an effective bonding area, that is bonded to the other electrode substrate, of more than 70% relative to an upper end of said spacer.

30. The liquid crystal display element as defined in claim 27, wherein said liquid crystal is ferroelectric liquid crystal.

31. The liquid crystal display element as defined in claim 27, wherein said electrode substrate has a minimum pressure of 20 kg/cm$^2$, where uneven alignment appears.

* * * * *